(12) United States Patent
Weber et al.

(10) Patent No.: US 11,639,204 B2
(45) Date of Patent: May 2, 2023

(54) AERODYNAMIC SYSTEM FOR VEHICLES AND METHODS FOR OPERATING THE SAME

(71) Applicant: XStream Trucking Inc., Phoenix, AZ (US)

(72) Inventors: Jeff Weber, Redwood City, CA (US); Burkley Kladde, Redwood City, CA (US); Daniel Burrows, Redwood City, CA (US); Jason Holt, Redwood City, CA (US); Shawn Monitor, Redwood City, CA (US)

(73) Assignee: XStream Trucking Inc., Phoenix, AZ (US)

( * ) Notice: Subject to any disclaimer, the term of this patent is extended or adjusted under 35 U.S.C. 154(b) by 0 days.

(21) Appl. No.: 17/307,812

(22) Filed: May 4, 2021

(65) Prior Publication Data
US 2021/0339806 A1 Nov. 4, 2021

Related U.S. Application Data

(60) Provisional application No. 63/019,939, filed on May 4, 2020.

(51) Int. Cl.
*B62D 35/00* (2006.01)
(52) U.S. Cl.
CPC .................. *B62D 35/001* (2013.01)
(58) Field of Classification Search
CPC .............................. B62D 35/001; B62D 37/02
See application file for complete search history.

(56) References Cited

U.S. PATENT DOCUMENTS

| | | | |
|---|---|---|---|
| 3,241,876 A | 3/1966 | Saunders |
| 3,486,464 A | 12/1969 | Dean |
| 3,697,120 A | 10/1972 | Saunders |
| 3,711,146 A | 1/1973 | Madzsar |
| 3,934,923 A | 1/1976 | Lissaman |
| 3,977,715 A | 8/1976 | Casci |
| 3,977,716 A | 8/1976 | Whited |
| 4,036,519 A | 7/1977 | Servais |
| 4,193,629 A | 3/1980 | Merkle |
| 4,290,639 A | 9/1981 | Herpel |
| 4,311,334 A | 1/1982 | Jenkins |

(Continued)

FOREIGN PATENT DOCUMENTS

| | | |
|---|---|---|
| CA | 2431380 | 12/2003 |
| DE | 3248122 | 7/1984 |

(Continued)

OTHER PUBLICATIONS

Ang-Olson et al., "Energy Efficiency Strategies for Freight Trucking: Potential Impact on Fuel Use and Greenhouse Gas Emissions," Transportation Research Record 1815, Paper No. 02-3877, pp. 11-18, Jan. 1, 2002.

*Primary Examiner* — Lori L Lyjak
(74) *Attorney, Agent, or Firm* — Loginov & Associates, PLLC; William A. Loginov

(57) ABSTRACT

A fairing system, including a fixed fairing assembly configured to attach to a cab of a tractor-trailer, a movable fairing assembly configured to attach to at least one of the fixed fairing assembly or the cab of the tractor-trailer, and an actuator assembly configured to move the movable fairing assembly relative to the fixed fairing assembly.

21 Claims, 13 Drawing Sheets

(56) References Cited

U.S. PATENT DOCUMENTS

| | | |
|---|---|---|
| 4,343,505 A | 8/1982 | Levassor |
| 4,397,496 A | 8/1983 | Drygas, III |
| 4,457,558 A | 7/1984 | Ishikawa |
| 4,462,628 A | 7/1984 | Gregg |
| 4,518,188 A | 5/1985 | Witten |
| 4,611,847 A | 9/1986 | Sullivan |
| 4,685,715 A | 8/1987 | Hardin |
| 4,693,506 A | 9/1987 | Massengill |
| 4,746,160 A | 5/1988 | Wiesemeyer |
| 4,750,772 A | 6/1988 | Haegert |
| 4,883,307 A | 11/1989 | Hacker |
| 4,904,015 A | 2/1990 | Haines |
| 4,932,716 A | 6/1990 | Marlowe |
| 5,078,448 A | 1/1992 | Selzer |
| 5,222,438 A | 6/1993 | Ende |
| 5,498,059 A | 3/1996 | Switlik |
| 5,522,637 A | 6/1996 | Spears |
| 5,658,038 A | 8/1997 | Griffin |
| 6,213,531 B1 | 4/2001 | Corey |
| 6,246,948 B1 | 6/2001 | Thakker |
| 6,257,654 B1 | 7/2001 | Boivin |
| 6,428,084 B1 | 8/2002 | Liss |
| 6,485,087 B1 | 11/2002 | Roberge |
| 6,527,334 B2 | 3/2003 | Oliver |
| 6,585,312 B2 | 7/2003 | Jain |
| 6,799,793 B1 | 10/2004 | Sladen |
| 6,846,035 B2 | 1/2005 | Wong |
| 6,886,882 B2 | 5/2005 | Farlow |
| 6,932,419 B1 | 8/2005 | McCullough |
| 7,374,229 B1 | 5/2008 | Noll |
| 7,374,230 B2 | 5/2008 | Breidenbach |
| 7,380,868 B2 | 6/2008 | Breidenbach |
| 7,618,086 B2 | 11/2009 | Breidenbach |
| 7,784,854 B2 | 8/2010 | Breidenbach |
| 7,850,224 B2 | 12/2010 | Breidenbach |
| 8,083,284 B1 | 12/2011 | Logounov |
| 8,100,461 B2 | 1/2012 | Smith |
| 8,123,281 B2 | 2/2012 | Perkins |
| 8,167,358 B2 | 5/2012 | Burrows |
| 8,272,680 B2 | 9/2012 | Breidenbach |
| 8,360,509 B2 | 1/2013 | Smith |
| 8,480,162 B2 | 7/2013 | Breidenbach |
| 8,608,228 B2 | 12/2013 | Visentin |
| 8,630,510 B2 | 1/2014 | Giuffrida |
| 8,708,399 B2 | 4/2014 | Smith |
| 8,827,351 B1 | 9/2014 | Kenevan |
| 8,876,191 B2 | 11/2014 | Breidenbach |
| 9,039,069 B2 | 5/2015 | Smith |
| 9,145,177 B2 | 9/2015 | Smith |
| 9,168,959 B2 | 10/2015 | Smith |
| 9,333,993 B2 | 5/2016 | Telnack |
| 9,346,496 B2 | 5/2016 | Breidenbach |
| 9,440,688 B2 | 9/2016 | Smith |
| 9,440,689 B1 | 9/2016 | Smith |
| 9,457,847 B2 | 10/2016 | Smith |
| 9,505,449 B2 | 11/2016 | Telnack |
| 9,656,698 B2 | 5/2017 | Smith |
| 9,937,965 B1 * | 4/2018 | Herpel .................. B62D 33/08 |
| 10,137,945 B2 | 11/2018 | Burrows |
| 10,569,815 B2 | 2/2020 | Boivin |
| 10,583,874 B2 | 3/2020 | Burrows |
| 2004/0119319 A1 | 6/2004 | Reiman |
| 2004/0239146 A1 | 12/2004 | Ortega |
| 2007/0200390 A1 | 8/2007 | Lotarev |
| 2008/0231434 A1 | 9/2008 | Hermann |
| 2008/0266135 A1 | 10/2008 | Curtis |
| 2009/0076700 A1 | 3/2009 | Radpour |
| 2009/0184539 A1 | 7/2009 | Pursley |
| 2009/0200834 A1 | 8/2009 | Vogel |
| 2010/0072779 A1 | 3/2010 | Pfaff |
| 2010/0194143 A1 | 8/2010 | Perkins |
| 2010/0201152 A1 | 8/2010 | Smith |
| 2011/0015809 A1 | 1/2011 | Hermann |
| 2011/0068602 A1 | 3/2011 | Burrows |
| 2011/0084516 A1 | 4/2011 | Smith |
| 2011/0153116 A1 | 6/2011 | Bedingfield, Sr. |
| 2012/0139290 A1 | 6/2012 | Kenevan |
| 2013/0238198 A1 | 9/2013 | Prentice |
| 2014/0176717 A1 | 6/2014 | De Paschoal |
| 2014/0367993 A1 | 12/2014 | Breidenbach |
| 2015/0035312 A1 | 2/2015 | Grandominico |
| 2015/0197292 A1 | 7/2015 | Smith |
| 2015/0239512 A1 | 8/2015 | Smith |
| 2015/0266520 A1 | 9/2015 | Breidenbach |
| 2015/0274220 A1 | 10/2015 | Telnack |
| 2015/0291231 A1 | 10/2015 | Smith |
| 2015/0321706 A1 | 11/2015 | Smith |
| 2015/0321707 A1 | 11/2015 | Menicovich |
| 2015/0360735 A1 | 12/2015 | Butler |
| 2016/0096559 A1 | 4/2016 | Traylor |
| 2016/0129951 A1 | 5/2016 | Park |
| 2016/0185400 A1 | 6/2016 | Martinus |
| 2016/0194037 A1 | 7/2016 | Logounov |
| 2018/0148107 A1 | 5/2018 | Burrows |
| 2018/0370581 A1 | 12/2018 | Williams |
| 2019/0071138 A1 | 3/2019 | Burrows |
| 2019/0071139 A1 | 3/2019 | Burrows |
| 2019/0185075 A1 | 6/2019 | Boivin |
| 2019/0283813 A1 | 9/2019 | Smith |
| 2020/0283077 A1 | 9/2020 | Burrows |
| 2020/0307724 A1 | 10/2020 | Burrows |
| 2021/0129923 A1 * | 5/2021 | Burrows ............... B62D 35/001 |

FOREIGN PATENT DOCUMENTS

| | | |
|---|---|---|
| DE | 19842994 | 4/2000 |
| EP | 1870320 | 12/2007 |
| GB | 2146597 | 4/1985 |
| JP | 5248460 | 7/2013 |
| JP | 2018116429 A | 7/2018 |
| RU | 2678760 C2 | 1/2019 |
| WO | 2008024386 | 2/2008 |
| WO | 2018102422 | 6/2018 |
| WO | 2018102422 A1 | 6/2018 |

* cited by examiner

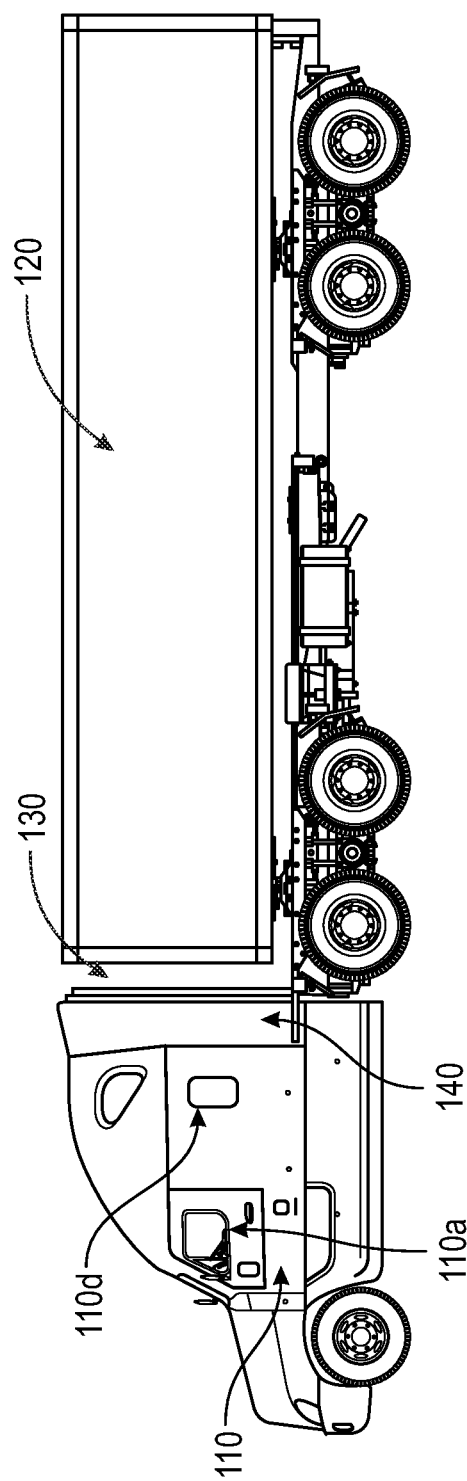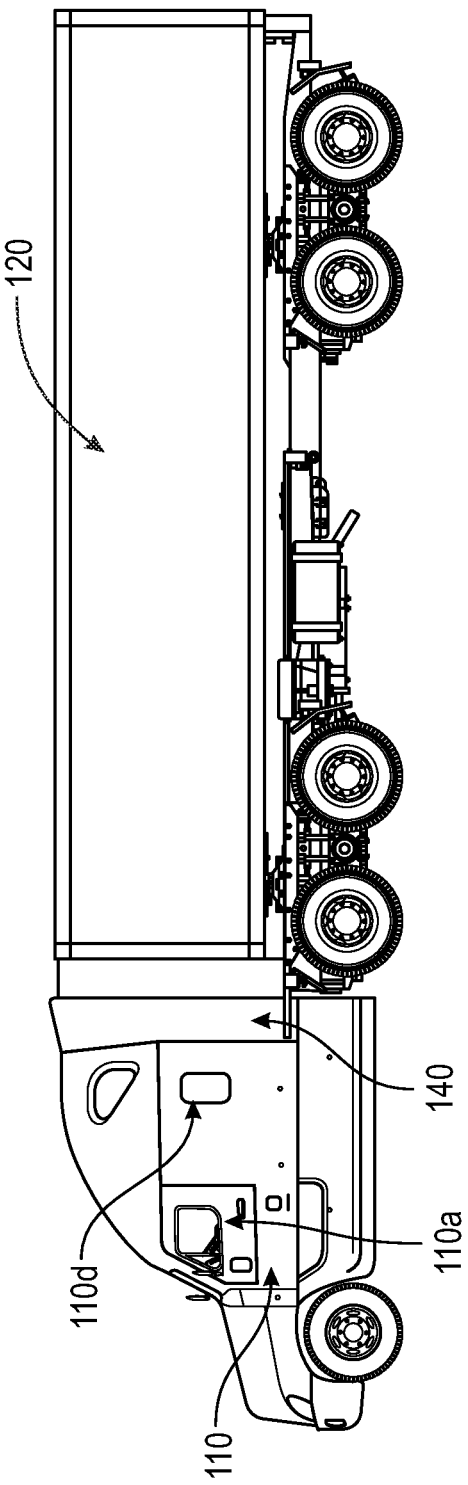
FIG. 1A
FIG. 1B

AERODYNAMIC SYSTEM FOR VEHICLES AND METHODS FOR OPERATING THE SAME

RELATED APPLICATIONS

This application claims the benefit of U.S. Provisional Application Ser. No. 63/019,939, filed May 4, 2020, entitled AERODYNAMIC SYSTEM FOR VEHICLES AND METHODS FOR OPERATING THE SAME, the entire disclosure of which is herein incorporated by reference.

FIELD OF THE INVENTION

The present application relates to an aerodynamic system for vehicles and methods for operating the same, in particular fairing systems and/or assemblies.

BACKGROUND OF THE INVENTION

Vehicles move a large number of people and cargo. Often two or more vehicles are physically coupled together to move freight or other cargo, people, and/or animals.

A ubiquitous example of coupled vehicles is that of the tractor-trailer or semi-trailer combination, which employs a tractor, sometimes referred to as a primary mover, coupled to pull one or more trailers. Such tractor-trailers or semis come in a large variety of forms and are typically used to move freight over relatively long distances. The tractor is the drive mechanism that pulls or pushes the trailer. The tractor includes the engine, typically an internal combustion diesel engine or an electric vehicle, a transmission and drive wheels. The tractor typically includes a cab where the driver or operator sits to operate the tractor. The tractor may also include a sleep cab which provides accommodations for the driver or operator when not in motion. The trailers are typically removably coupled to the tractor via a coupler such as a fifth wheel carried by the tractor and kingpin carried by the trailer, or less commonly via an automatic coupling. A semi-trailer typically does not have a front axle, relying on the tractor for support of a portion of the trailer's weight, and may have one or typically more rear axles. In some instances, a tractor may pull multiple trailers, forming a train. In such a case, the following trailer(s) may not have front axles and may rely on the proceeding trailers for supporting a portion of the trailer's weight. Trailers come in a large variety, for example box, bus, curtain side, flatbed, "low boy", refrigerated or "reefer", tanker, dry bulk, car carrier, drop deck, "double decker" or sidelifter. Trailers are often substantially rectangular, having a front end which is coupled to the tractor and a back end spaced remotely from the tractor. The back end often includes a door or more commonly a pair of doors to provide access to an interior of the trailer from an exterior thereof. The front end, back end, and sides of a trailer tend to be vertically extending surfaces. In some instances, a portion of a trailer or an accessory thereof may extend horizontally from these vertically extending surfaces, for example a refrigeration system or heater or nose cone may extend forward from the front of a trailer in to a gap region between a tractor and coupled trailer.

Another example of coupled vehicles is railroad trains. Railroad trains typically include one or more locomotives that pull a number of cars along a set of tracks. The cars may include passenger cars and/or freight cars. The freight cars can take a large variety of forms, similar in some respects to the various types of trailers.

Tractor-trailers or semis and railroad trains are increasingly used to move containerized cargo. This multi-modal approach allows containerized cargo to be conveniently moved between ships (e.g., ocean going container ships, barges), tractor trailers, and/or railroad trains. For instance, containers may arrive by ship from overseas. Tractor-trailers may move some of the containers over roads to warehouses or to retail locations. Tractor-trailers may move some of the containers to rail yards. Some containers may be moved via railroad trains, and subsequently moved to a desired location via tractor-trailers.

Coupled vehicles typically must be capable of operating in a variety of environments. For example, coupled vehicles must be capable of carrying loads at relatively high speed over long distance. For instance, tractor-trailer combinations typically must be able to haul freight over highways such as toll roads or freeways within some posted speed limit. Such highways are typically relatively straight over long distances, and do not require much turning or maneuvering. Such tractor-trailers typically must also be able to haul freight over surface streets at much lower posted speed limits. Travel over surface streets typically requires higher maneuverability than travel over highways, often requiring essentially right angle turns in relatively confined spaces or navigating steep elevational changes.

Fuel efficiency is typically an important concern when operating coupled vehicles. A large portion of the cost of moving freight or people is attributable to fuel costs and the majority of fuel at highway speeds is spent overcoming aerodynamic drag. Fuel efficiency tends to decrease as speed increases. Fuel efficiency while traveling on highways is particularly a concern since the average speed is higher than on surface roads and, for most operations, more time is spent on highways than on surface streets.

Numerous approaches have been suggested for increasing fuel efficiency of vehicles. These approaches typically employ ferrules, fairings, cowlings, air dams, deflectors, and/or spoilers located at various locations, for instance on a front of the tractor or over a roof of the tractor. Some approaches for increasing fuel efficiency specifically address the problem created by the fact that there is a gap between the tractor and trailer. Some of the approaches for increasing fuel efficiency are illustrated in (e.g.) U.S. Pat. Nos. 3,697,120; 3,711,146; 3,934,923; 4,036,519; 4,750,772; 5,078,448; and 6,585,312, referenced herein as useful background information.

SUMMARY OF THE INVENTION

One aspect of the disclosure provides a fairing system, comprising a fixed fairing assembly configured to attach to a cab of a tractor-trailer, the fixed fairing assembly being a unitary assembly and comprising a first lateral portion, a second lateral portion, and a movable top portion; a movable fairing assembly configured to attach to at least one of the fixed fairing assembly or the cab of the tractor-trailer; and an actuator assembly configured to move the movable fairing assembly relative to the fixed fairing assembly.

One aspect of the disclosure provides a fairing system, comprising: a fixed fairing assembly configured to attach to a cab of a tractor-trailer, the fixed fairing assembly being a unitary assembly and comprising a first lateral portion, a second lateral portion, and a movable top portion; a movable fairing assembly configured to attach to at least one of the fixed fairing assembly or the cab of the tractor-trailer; and an actuator assembly configured to move the movable fairing assembly relative to the fixed fairing assembly.

In one example, the fixed fairing assembly is configured to be at least one of: removably attached to the cab of the tractor-trailer; or permanently attached to the cab of the tractor-trailer.

In one example, the fixed fairing assembly and the movable fairing assembly are configured to substantially completely enclose a gap defined between the cab and a trailer of the tractor-trailer.

In one example, the movable fairing assembly is configured to be at least one of: removably attached to the cab of the tractor-trailer; permanently attached to the cab of the tractor-trailer; removably attached to the fixed fairing assembly; or permanently attached to the fixed fairing assembly.

In one example, the actuator assembly is configured to move the movable fairing assembly from a first undeployed position to a second deployed position.

In one example, the actuator assembly is configured to move the movable fairing assembly to at least one intermediate position between the first undeployed position and the second deployed position.

Another aspect of the disclosure provides a fairing system, comprising: a fixed fairing assembly configured to attach to a cab of a tractor-trailer; a movable fairing assembly configured to attach to at least one of the fixed fairing assembly or the cab of the tractor-trailer, the movable fairing assembly configured to move from a first undeployed position to a second deployed position in which the fixed fairing assembly and at least one lateral portion the movable fairing assembly forms a continuously outwardly tapered surface from a rear of the cab to the trailer; and an actuator assembly configured to move the movable fairing assembly relative to the fixed fairing assembly.

In one example, the at least one lateral portion comprises a plurality of lateral portions.

Another aspect of the disclosure provides a fairing system configured to attach to a cab of a tractor-trailer, the cab having a first rectangular cross-sectional profile and a trailer of the tractor-trailer having a second, larger, rectangular cross-sectional profile, the fairing system comprising: a fixed fairing assembly configured to attach to a cab of a tractor-trailer; a movable fairing assembly configured to attach to at least one of the fixed fairing assembly or the cab of the tractor-trailer, the movable fairing assembly configured to move from a first undeployed position to a second deployed position in which the fixed fairing assembly and the movable fairing assembly form a continuously tapered surface from the first rectangular cross-sectional profile to the second, larger, rectangular cross-sectional profile; and an actuator assembly configured to move the movable fairing assembly relative to the fixed fairing assembly.

Another aspect of the disclosure provides a fairing system, comprising: a fixed fairing assembly configured to attach to a cab of a tractor-trailer, the fixed fairing assembly having a movable first top portion; a movable fairing assembly configured to attach to at least one of the fixed fairing assembly or the cab of the tractor-trailer, the movable fairing assembly having a movable second top portion, the movable fairing assembly configured to move from a first undeployed position to a second deployed position during which the movable first top portion rotates in synchronicity with the movable second top portion; and an actuator assembly configured to move the movable fairing assembly relative to the fixed fairing assembly.

Another aspect of the disclosure provides a fairing system, comprising: a fixed fairing assembly configured to attach to a cab of a tractor-trailer, the fixed fairing assembly having a movable first top portion; a movable fairing assembly configured to attach to at least one of the fixed fairing assembly or the cab of the tractor-trailer, the movable fairing assembly having a movable second top portion, the movable fairing assembly configured to move from a first undeployed position to a second deployed position during which the movable first top portion rotates rearward and downward; and an actuator assembly configured to move the movable fairing assembly relative to the fixed fairing assembly.

Another aspect of the disclosure provides a fairing system, comprising: a fixed fairing assembly configured to attach to a cab of a tractor-trailer, the fixed fairing assembly having a movable first top portion; a movable fairing assembly configured to attach to at least one of the fixed fairing assembly or the cab of the tractor-trailer, the movable cab fairing assembly having a movable second top portion, the movable fairing assembly configured to move from a first undeployed position to a second deployed position during which the movable second top portion rotates rearward and moves upward; and an actuator assembly configured to move the movable fairing assembly relative to the fixed fairing assembly.

Another aspect of the disclosure provides a fairing system, comprising: a fixed fairing assembly configured to attach to a cab of a tractor-trailer, the fixed cab fairing assembly having a movable first top portion; a movable fairing assembly configured to removably attached to at least one of the fixed cab fairing assembly or the cab of the tractor-trailer, the movable cab fairing assembly having a movable second top portion, the movable fairing assembly configured to move from a first undeployed position to a second deployed position during which the movable first top portion rotates rearward and moves downward and the movable second top portion rotates rearward and moves upward in synchronicity with the movement of the movable first top portion; an actuator assembly configured to move the movable fairing assembly relative to the fixed fairing assembly.

Another aspect of the disclosure provides a fairing system, comprising: a fixed fairing assembly configured to attach to a cab of a tractor-trailer, the fixed fairing assembly having a movable first top portion; a movable fairing assembly configured to attach to at least one of the fixed fairing assembly or the cab of the tractor-trailer, the movable fairing assembly having a movable second top portion, the movable fairing assembly configured to move from a first undeployed position to a second deployed position during which the movable second top portion rotates rearward and upward to at least partially cover a gap defined between the cab and a trailer; an actuator assembly configured to move the movable fairing assembly relative to the fixed fairing assembly.

Another aspect of the disclosure provides a fairing system, comprising: a fixed fairing assembly configured to attach to a cab of a tractor-trailer, the fixed fairing assembly having a movable first top portion; a movable fairing assembly configured to attach to at least one of the fixed fairing assembly or the cab of the tractor-trailer, the movable fairing assembly having a movable second top portion, the movable fairing assembly configured to move from a first undeployed position to a second deployed position during which the movable first top portion rotates rearward and downward and the movable second top portion rotates rearward and moves upward to form a substantially continuous surface between the cab and a trailer; an actuator assembly configured to move the movable fairing assembly relative to the fixed fairing assembly.

In one example, the substantially continuous surface is configured to prevent a passage of air flow from outside of a gap defined between the cab and a trailer into the gap via the substantially continuous surface.

Another aspect of the disclosure provides a fairing system, comprising: a fixed fairing assembly configured to attach to a cab of a tractor-trailer, the fixed fairing assembly having a first plurality of lateral portions; a movable fairing assembly configured to attach to at least one of the fixed fairing assembly or the cab of the tractor-trailer, the movable fairing assembly having a second plurality of lateral portions, the movable fairing assembly configured to move from a first undeployed position to a second deployed position during which at least one of the second plurality of lateral portions rotate outward and upward; an actuator assembly configured to move the movable fairing assembly relative to the fixed fairing assembly Another aspect of the disclosure provides a fairing system, comprising: a fixed fairing assembly configured to attach to a cab of a tractor-trailer, the fixed cab fairing assembly having a first plurality of lateral portions; a movable fairing assembly configured to attach to at least one of the fixed fairing assembly or the cab of the tractor-trailer, the movable cab fairing assembly having a second plurality of lateral portions, the movable fairing assembly configured to move from a first undeployed position to a second deployed position thereby defining a longitudinal gap between the first plurality of lateral portions and the second plurality of lateral portions; an actuator assembly configured to move the movable fairing assembly relative to the fixed fairing assembly.

In one example, the longitudinal gap has a length such that air flow from outside of a gap defined between the cab and a trailer is preventing from passing into the gap via the longitudinal gap.

Another aspect of the disclosure provides a method of operating a tractor-trailer, comprising: attaching a fixed fairing assembly to a cab of the tractor-trailer; attaching a movable fairing assembly to at least one of the fixed fairing assembly or the cab; modifying a direction of movement of the tractor-trailer; and in response to the modified direction of movement, rotating a movable first top portion of the fixed fairing assembly and rotating a movable second top portion of the movable fairing assembly to accommodate for pivotal rotation of the trailer relative to the cab.

In one example, the method further comprises deploying the movable fairing assembly from a first undeployed position to a second deployed position.

In one example, the method further comprises modifying a direction of movement of the tractor-trailer comprises at least one of: a driver turning a wheel; or turning a wheel in response to a command from a controller.

Another aspect of the disclosure provides a fairing system, comprising: a fixed fairing assembly configured to attach to a cab of a tractor-trailer; a movable fairing assembly configured to attach to at least one of the fixed fairing assembly or the cab of the tractor-trailer; a wind sensor configured to detect at least one of a wind speed or a wind direction; an actuator assembly configured to move the movable fairing assembly relative to the fixed fairing assembly based in part on at least one of the detected wind speed or the detected wind direction.

Another aspect of the disclosure provides a fairing system, comprising: a fixed fairing assembly configured to attach to a cab of a tractor-trailer and forming a substantially continuous surface with at least one surface of the cab; a movable fairing assembly configured to attach to at least one of the fixed fairing assembly or the cab of the tractor-trailer; and an actuator assembly configured to move the movable fairing assembly relative to the fixed fairing assembly.

In one example, the substantially continuous surface is configured to prevent a passage of air flow from outside of a gap defined between the cab and a trailer into the gap via the substantially continuous surface.

Another aspect of the disclosure provides a fairing system, comprising: a fixed fairing assembly configured to attach to a cab of a tractor-trailer; a movable fairing assembly configured to attach to at least one of the fixed fairing assembly or the cab of the tractor-trailer; an actuator assembly configured to move the movable fairing assembly relative to the fixed fairing assembly, the actuator comprising an airbag assembly.

Another aspect of the disclosure provides a tractor-trailer system, comprising: an engine management system configured to receive at least one parameter from an engine of a tractor trailer; a fairing system having at least one actuator, the actuator configured to selectively move a movable fairing assembly; and a controller in communication with the engine management system and configured to issue a command to cause selective movement of the movable fairing assembly based at least in part on the at least one parameter.

In one example, the selective movement comprises at least one of: direction of movement of the movable fairing assembly, speed of movement of the movable fairing assembly, or distance of movement of the movable fairing assembly.

In one example, the at least one parameter comprises at least one of: speed, temperature, gear, power, throttle position, fuel consumption, fuel rate, brake pressure, or brake position.

BRIEF DESCRIPTION OF THE DRAWINGS

The invention description below refers to the accompanying drawings, of which:

FIG. 1A is side view of a tractor-trailer with a fairing system in the retracted configuration;

FIG. 1B is a side view of the tractor-trailer with the fairing system in the deployed configuration;

DETAILED DESCRIPTION

Figure 2A:
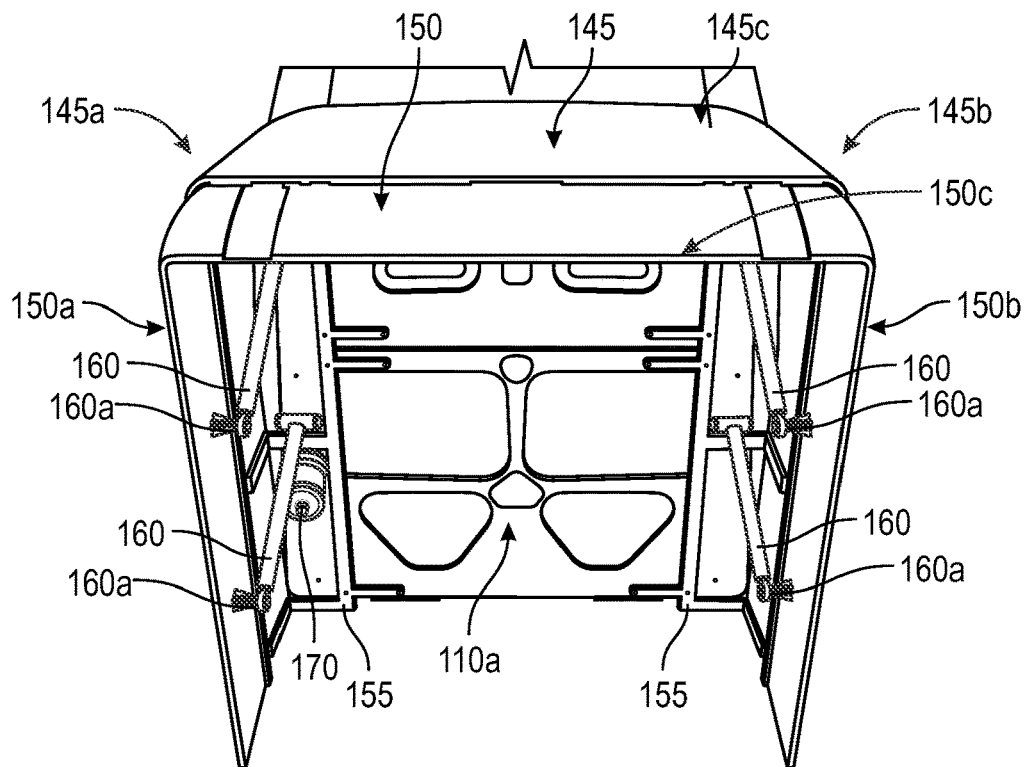
FIG. 2A is a rear perspective view of a cab of the tractor-trailer with a fairing system in a deployed state.

FIG. 1A is side view of a tractor-trailer with a fairing system in the retracted state and FIG. 1B is a side view of the tractor-trailer with the fairing system in the deployed state.

The hitches/assembled tractor-trailer 100 can include a tractor 110 and a trailer 120. The tractor 110, e.g., a lead vehicle, which in typical operation is at the front or ahead of a trailer 120, e.g., trailing vehicle, with respect to a direction of travel during normal operation. It is recognized that in some instances, the lead vehicle may at times be behind the trailing vehicle, for example when backing up. In the illustrated implementation, the lead vehicle is the tractor 110, which includes an engine (e.g., internal combustion diesel engine, not shown), a transmission (not shown), drive wheels, steering wheel, throttle (not shown), and brakes (not shown). In other examples, the tractor-trailer 100 can be an electric vehicle. The tractor 110 may be typical of those commonly used in long haul trucking within the United States, such as those manufactured and sold under the Kenworth® and Peterbilt® trademarks, among other brands/manufacturers. The tractor 110 may include a cab 110a in which the driver or operator sits while driving or operating the tractor 110. The tractor 110 may also include a sleeper cab 110d, located behind the cab 110c, which a driver or operator may use as a residence or sleep area when the tractor 110 is parked. The back of the tractor 110 may have a width. The tractor 110 may have one or more ferrules, fairings, cowlings, air dams, deflectors, and/or spoilers located at various locations to reduce aerodynamic drag and thereby increase fuel efficiency.

The trailer 120 may take any of a variety of forms. For example, the trailer 120 may take the form of a semi-trailer, which includes a set of rear wheels, relying on the tractor 110 to support a portion of the weight of the trailer 120 at a front end of the trailer 120, instead of having a front axle. The trailer 120 may take the form of a box trailer, or any variety of other types of trailers, for instance bus, curtain side, flatbed, "low boy", refrigerated or "reefer", tanker, dry bulk, car carrier, drop deck, "double decker" or sidelifter trailers. As illustrated the trailer typically has a front that extends substantially vertically, although one or more portions or objects may extend horizontally forward of from the front of the trailer, e.g., a cooler unit, a heater unit, a nose cone.

Although the trailer 120 is depicted as having a same or similar height with respect to the tractor 110, in some examples the trailer 120 can have a height that is different than the tractor 110. In particular, in an example, the trailer 120 can have a height that is greater than the tractor 110.

As shown, the trailer 120 is physically coupled to the tractor 110. Tractors 110 typically carry a fifth wheel, to which the trailer 120 is removably or detachably physically coupled. Fifth wheels generally include metal plates skid plates and jaws on one vehicle, usually the tractor, and which receive a kingpin carried by the other vehicle, usually the trailer. Fifth wheels are commonly employed in tractor trailer(s) 10, so will not be described in detail. There may be additional couplings between the tractor 110 or components thereof and the trailer 120 or components thereof. For example, there may be one or more electrical couplings, pneumatic couplings and/or hydraulic couplings. Such may, for example, provide electrical power or signals to the trailer 120 or component thereof, for instance a refrigeration system, turn signal indicators and/or brake lights. Such may, for example, supply pressurized fluid or air to the trailer 120 or a component thereof, for instance brakes.

While FIGS. 1A-B depict a tractor-trailer 100, it is contemplated that the fairing system 140 can be implemented in a variety of vehicle types, such as trains, pick-up trucks, or any type of vehicle capable of or configured for pulling or towing a trailer.

As shown in FIG. 1A, a gap 130 is defined between the tractor 110 and the trailer 120. The gap region 130 is sufficiently large as to allow the tractor-trailer 100 to maneuver as need, for example through surface streets of a city of town. For instance, the gap 130 may be approximately 1.5 meters or 4.5 feet in length. This gap region 130 negatively affects the aerodynamics associated with the vehicle body, and hence hinders fuel efficiency, particularly at higher speeds such as highway speeds (e.g., 55-75 mph).

The gap 130 is a three-dimensional volume defined at least in part by: a rear surface of the tractor 110 (e.g., a rear surface of cab 110a or sleeper cab 110d) and imaginary planes connecting the rectangular profiles between the tractor 110 and the trailer 120.

As shown in FIG. 1B, the fairing system 140 is in a deployed configuration and at least partially, substantially completely, or completely covers the gap 130. Substantially completely, for example, can include configurations whereby the fairing system 140 does not completely cover the gap 130, but the coverage afforded in this example is sufficient to prevent appreciable airflow into/out of the gap 130 in a manner that substantially improves aerodynamics and fuel efficiency.

In an example, the fairing system 140, in the deployed configuration, completely encloses the tractor-trailer gap 130. Enclosing (at least partially, substantially completely, or completely) the gap 130 keeps airflow close to an outer surface of the fairing system 140 (e.g., outer surfaces of portions 145a-c and/or 150a-c described below) so that the airflow moves from tractor 110 to trailer 120 without the airflow impacting trailer edges, and maintaining maximum "seal" or isolation of the volume that they enclose which is of higher pressure than the outside airflow. Additionally, to maximize this effect, outward taper blending from cab to trailer (as shown below in FIGS. 3A-B and 4A-B) increases the benefits of this pressure differential by providing additional thrust on the fairings themselves at no cost to drag. The exemplary implementation of the fairing system 140 herein is arranged to enclose (completely, substantially completely, or partially) the tractor-trailer gap 130 in an active manner, extending or deploying to fill the gap 130 at highway speeds and retracting or undeploying to allow trailer articulation at low speeds. Advantageously, the fairing system 140 imposes the fewest constraints on cab and trailer mounted equipment, tractor-trailer operation, and maximizes potential integration with the tractor 110 and cab 110*a*.

The fairing system 140 of the present application is advantageously compatible with reefers (as described below relative to FIGS. 6A-B and 7A-B), heaters, and other trailer-mounted equipment. Further, it is compatible with spares tires, stock hook-up lights, hose hangers, and other cab-mounted equipment.

Figure 2B:
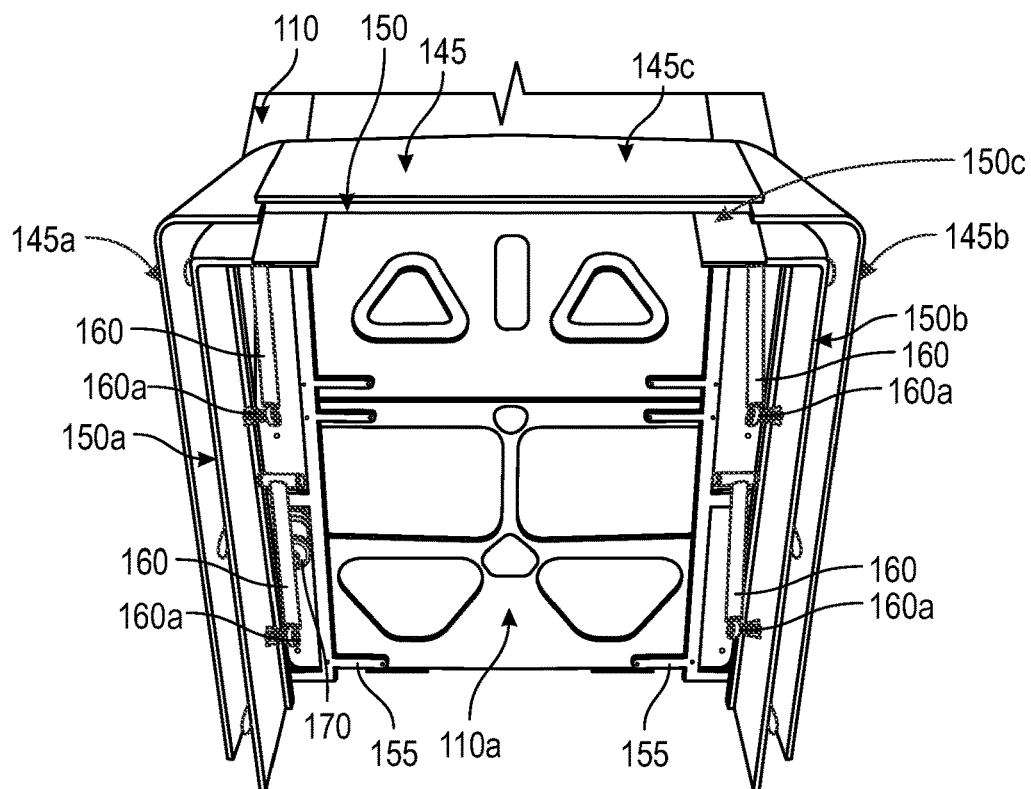
FIG. 2B is a rear perspective view of a cab of the tractor-trailer with a fairing system in a retracted state.
Figure 2C:
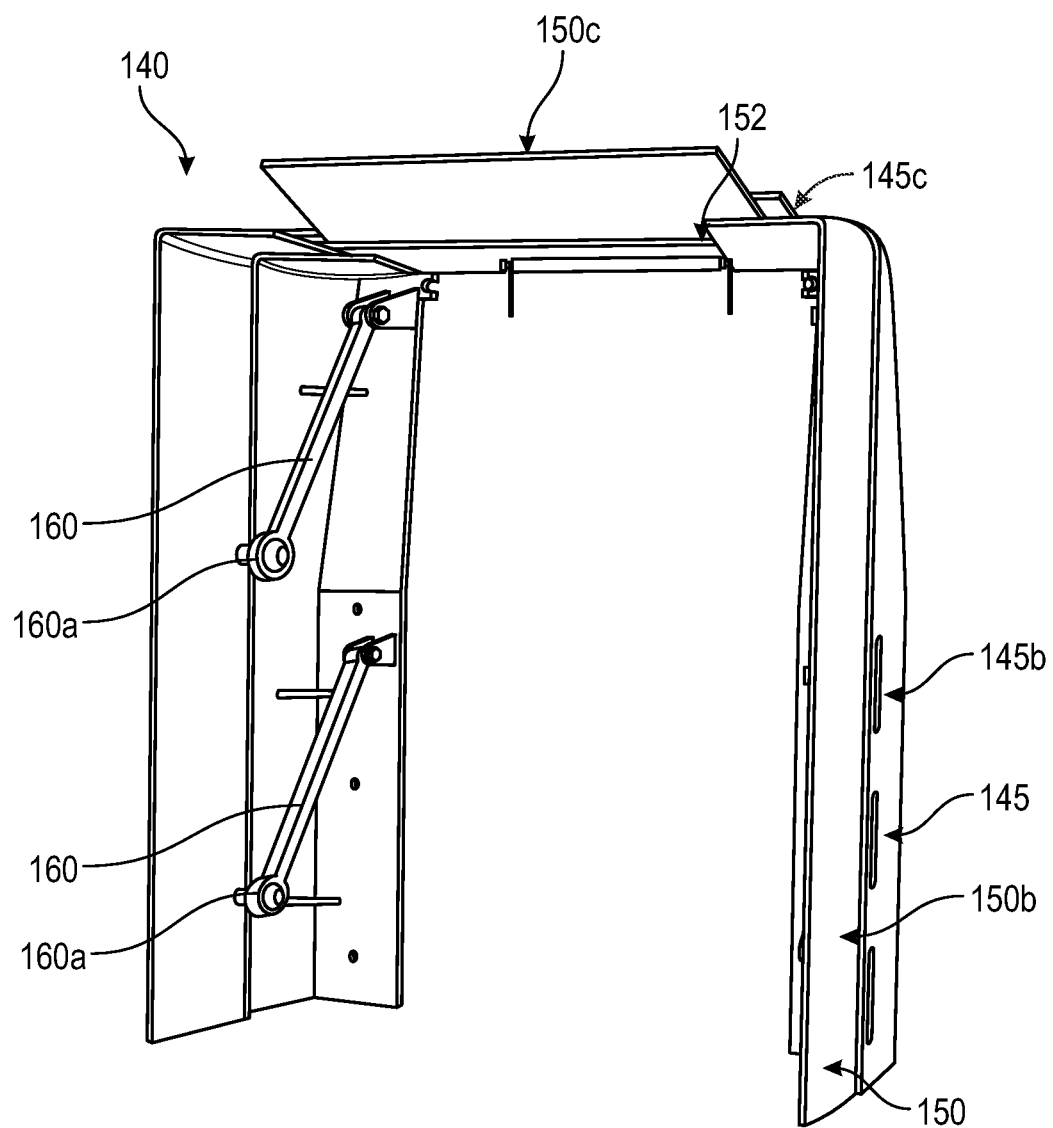
FIG. 2C is a rear perspective view of a fairing assembly in a deployed state.
Figure 2D:
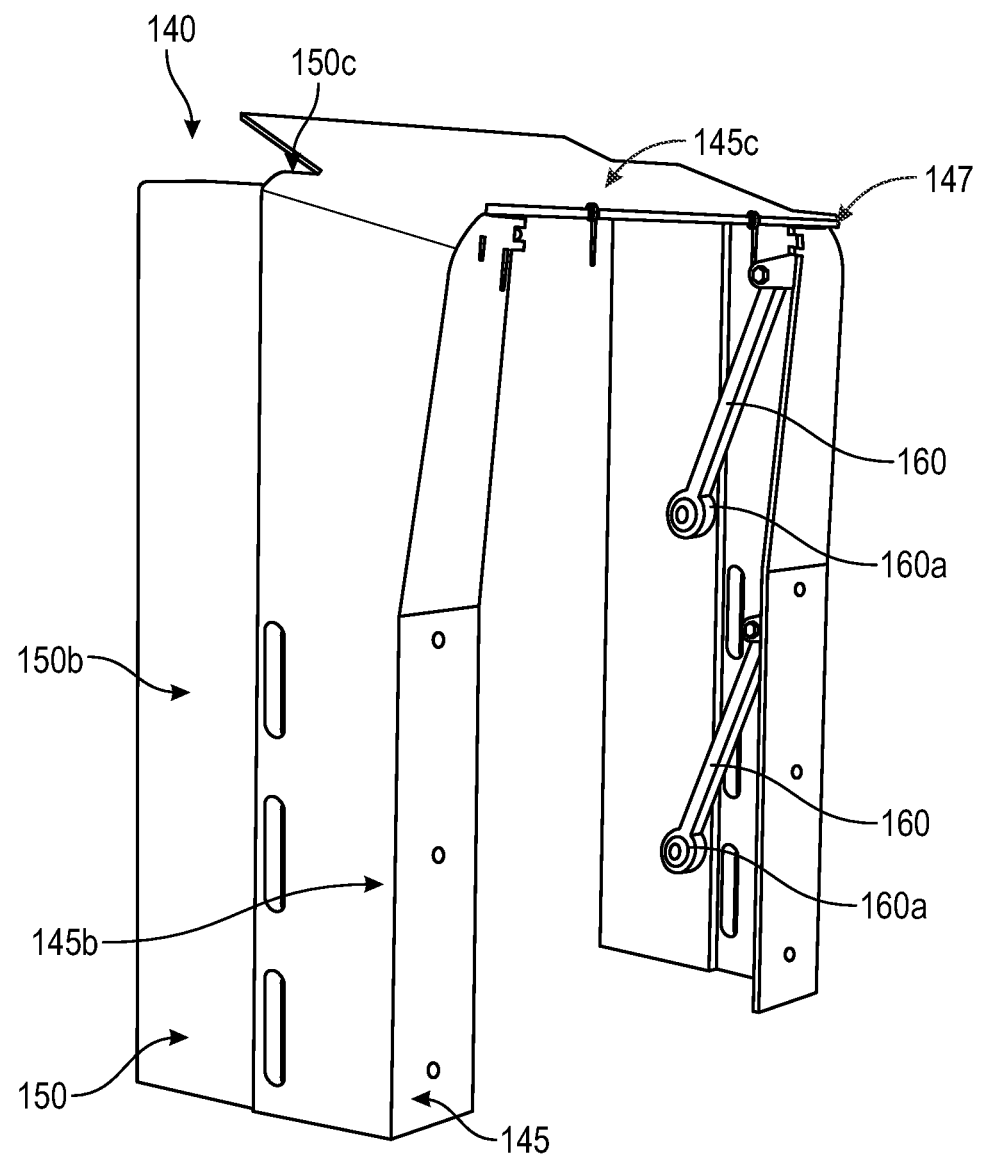
FIG. 2D is a front perspective view of a fairing assembly in a deployed state.

FIG. 2A is a rear perspective view of a cab 110*a* of the tractor-trailer 100 with a fairing system 140 in a deployed state and FIG. 2B is a rear perspective view of a cab 110*a* of the tractor-trailer 100 with a fairing system 140 in a retracted state. The fairing system 140 can include a fixed fairing assembly 145 and a movable fairing assembly 150. Additionally, FIG. 2C is a rear perspective view of a fairing assembly in a deployed state and FIG. 2D is a front perspective view of a fairing assembly in a deployed state.

The fixed fairing assembly 145 can include a first lateral portion 145*a*, a second lateral portion 145*b*, and a top portion 145*c*. In an example, the portions 145*a-c* can be unitary while in other examples, the portions 145*a-c* can separate subassemblies or the pieces interconnected to form overall fixed fairing assembly 145.

The movable fairing assembly 150 can include a first lateral portion 150*a*, a second lateral portion 150*b*, and a top portion 150*c*. In an example, the portions 150*a-c* can be unitary while in other examples, the portions 150*a-c* can be separate subassemblies or pieces interconnected to form the overall movable fairing assembly 150. Advantageously, the fairing system 140 and assemblies 145, 150 of the present application is/are highly contoured/curved to match optimal airflow of the tractor and/or trailer, e.g., tractor-trailer in combination.

The fixed fairing assembly 145 or the movable fairing assembly 150 can be constructed any type of material, such as injection molded plastic, thermoformed plastic, fiberglass reinforced plastic or composite, metal framework, or a combination thereof. The assemblies 145 or 150 can also include integral cab mounting features and may be designed to be compliant to impacts and allow deformation, while maintaining sufficient rigidity for aerodynamic purposes. This could be zonal or in its entirety. The fixed fairing assembly 145 may include additional integration features including hand holds, access holes, and aerodynamic vents.

The fairing system 140, or any component thereof (including assemblies 145, 150), can be directly, indirectly, permanently, semi-permanently, and/or removably attached or coupled to the cab 110*a* of the tractor 110 (or any other portion of the trailer 110, such as sleeper cab 110*d*). For example, the fixed fairing assembly 145 can be coupled directly to the cab 110*a* of the tractor 110 by integral attachment points on a rear of the cab 110*a* of the tractor 110 or by drilled attachment points on a rear of the cab 110*a* of the tractor 110. The movable fairing assembly 150 can be removably (or permanently) coupled directly or indirectly to the fixed fairing assembly 145 and/or removably (or permanently) coupled directly or indirectly to the cab 110*a* of the tractor 110. When coupled to the cab 110*a* of the tractor 110, the movable fairing assembly 150 can be coupled to the same or additional integral attachment points or the same or different drilled attachment points described above.

The fairing system 140 can include one or more mounting structures 155 coupled to the cab 110*a* of the tractor 110 and that can be coupled to the movable fairing assembly 150 via one or more swing arms 160. Motion of the swing arms 160 (as caused by an actuator assembly described below) can provide for a corresponding motion of the movable fairing assembly 150, as will be described in greater detail below. The mounting structure 155 can be coupled to the cab 110*a* of the tractor 110 via the same or additional integral attachment points or the same or different drilled attachment points described above.

During deployment, the lateral portions 150*a*, 150*b* are arranged to move upward and outward by virtue of the motion of the swing arms 160, as shown in FIGS. 3A-B and 4A-B, as they move rearward covering the gap 130 in a semi-telescopic fashion with respect to the fixed fairing assembly 145. The outward and upward movement of the lateral portions 150*a*, 150*b* achieves an outward taper from the trailing edge profile of the fixed fairing assembly 145 (e.g., one or more of portions 145*a, b, c*) to the trailer 120. This motion is achieved through the use of the one or more swing arms 160 attached to the fixed fairing assembly 145 or cab 110*a* of the tractor 110. In an example, each swing arm 160 is connected respectively to the movable fairing assembly 150 and the cab 110*a* (and/or mounting structure 155) via a revolute joint 160*a* at each end. In another example, spherical joints could be employed. In the example of spherical joints, a central translating joint can be implemented to accommodate more load to adequately constrain the extra degrees of freedom.

The geometry of the one or more swing arms 160 is highly variable depending on particular implementations and by the desired end position of the movable fairing assembly 150. In an example, the one or more swing arms 160 can be optimized for variable translation. The swing arms 160 are oriented such that they swing outward as they rotate facilitating the outward movement. The rotation points of the swing arms 160 facilitate the back and upward movement of the lateral portions 150*a, b*. In this way, the swing arms 160 rotate through imaginary planes that are not parallel to one another and converge at a point within or in front of the cab 110*a* of the tractor 110. This arrangement allows the lateral portions 150*a, b* to rotate outward during deployment. The length and orientation of the swing arms 160 is such that the translation rearward is greater than the translation upward.

An actuator assembly 170 (not shown in FIGS. 2C-2D) including one or more actuators can be implemented to initiate motion of the swing arms 160 and ultimately the movable fairing assembly 150. The actuator assembly 170 can be positioned below a lower swing arm 160 and between the lower swing arm 160 and cab 110. While one actuator 170 is depicted in FIG. 2A, additional actuators 170 can be implemented with respect to one or more of the remaining swing arms 160. For example, actuators 170 can be implemented on the lower swing arms 160 only, one actuator on a lower swing arm and one on an upper swing arm 160 160, or any other configuration. The kinematics of the swing arms 160 allow use of high load, short displacement actuators such as air bags (as shown in FIGS. 2A-B) with end fittings and a collapsible rubber bladder. In the example of air bags, an inflated airbag can hold the swing arms 160 and ultimately the movable fairing assembly 150 in the deployed position, while deflation of the airbag can cause retraction/ undeployment and gravity can return the movable fairing assembly 150 back to the undeployed position from the deployed position. In other example, pneumatic, hydraulic cylinders, electro-mechanical actuators, or pressure/force elements may be used.

Figure 3A:
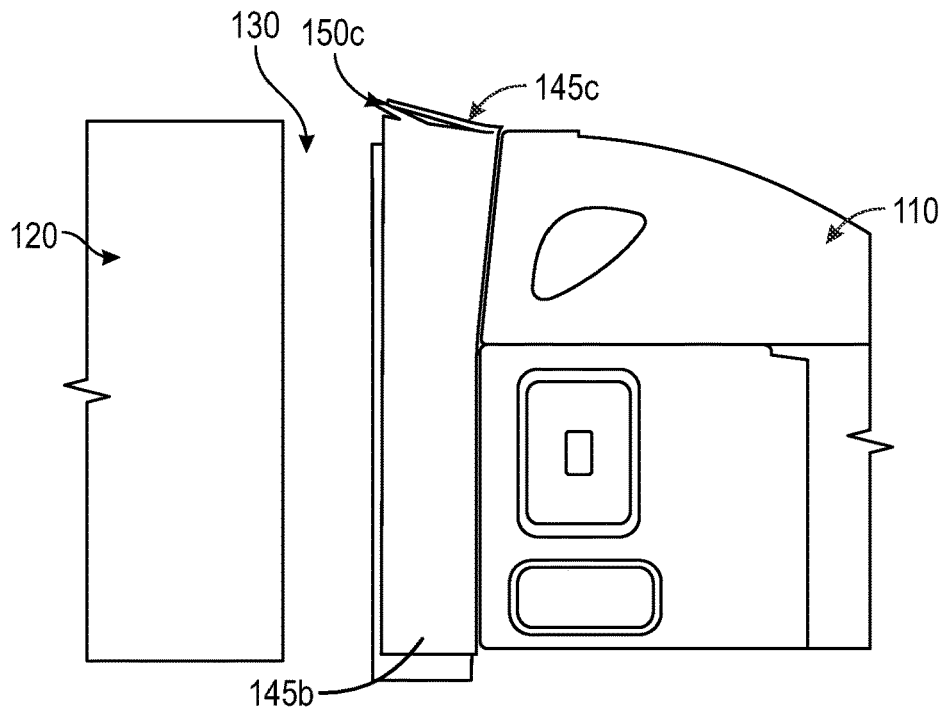
FIG. 3A is a side view of a tractor-trailer with a fairing system in a retracted state.
Figure 3B:
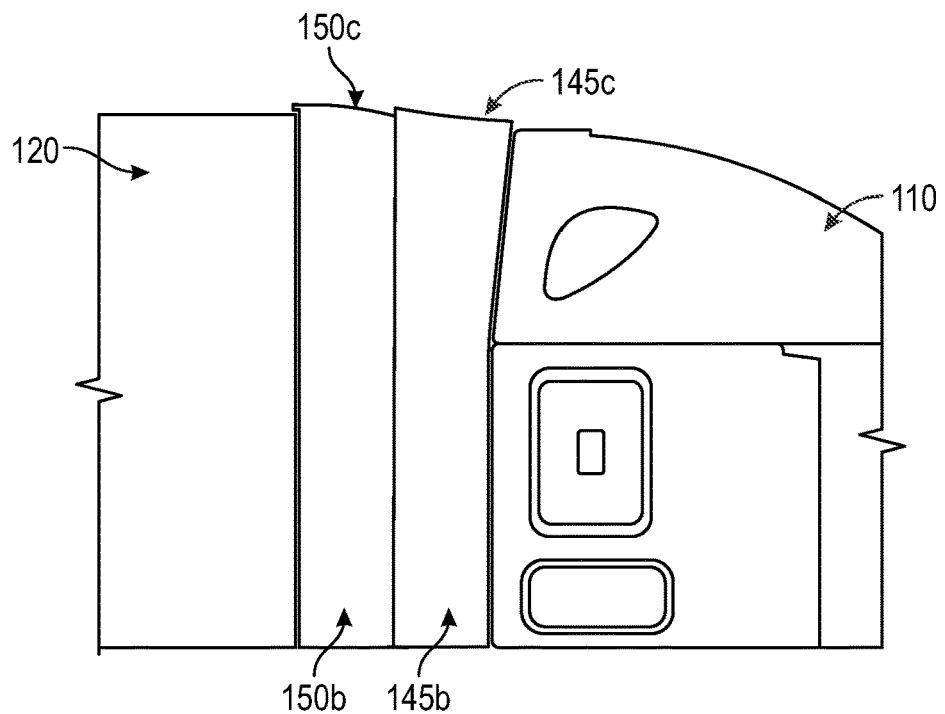
FIG. 3B is a side view of a tractor-trailer with a fairing system in a deployed state.

FIG. 3A is a side view of a tractor-trailer with a fairing system in a retracted state and FIG. 3B is a side view of a tractor-trailer with a fairing system in a deployed state.

Figure 5A:
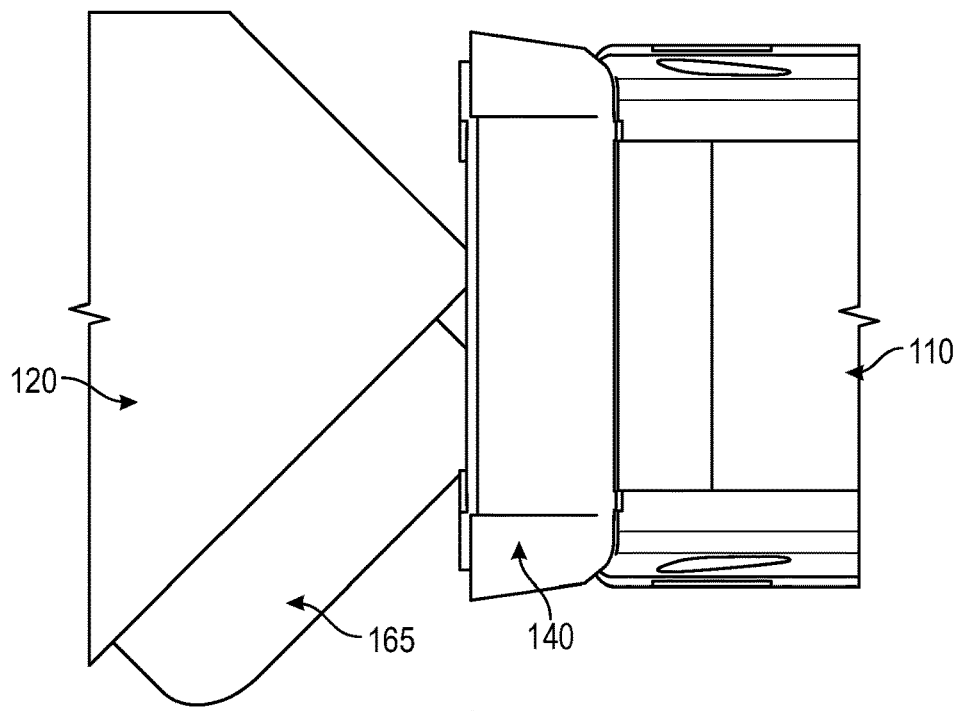
FIG. 5A is a top view of a tractor-trailer with an articulated trailer relative to the cab with a fairing system in a retracted state.
Figure 5B:
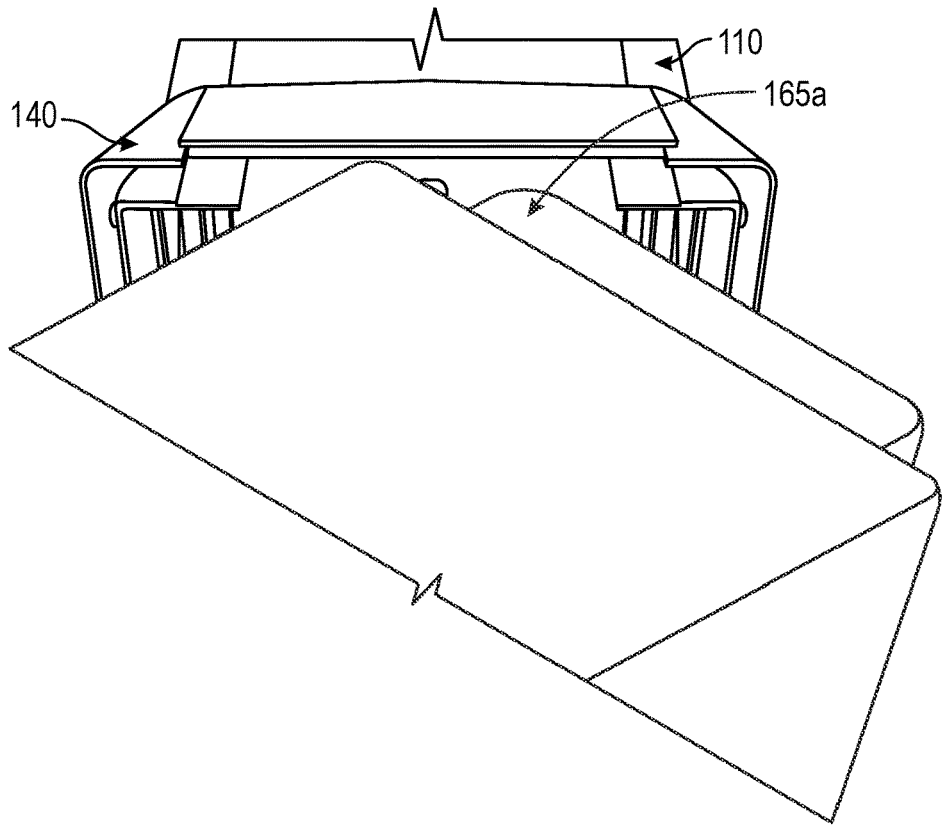
FIG. 5B is a rear perspective view of a tractor-trailer with an articulated trailer relative to the cab with a fairing system in a retracted state.

The top portion 145c can be movable or rotatable relative to the lateral portions 145a, b to enable trailer corner clearance during turning/articulation of the tractor-trailer 120 where the corner of the trailer 120 swings through the central portion (as shown in FIGS. 5A-B). The motion envelope of the trailer and trailer corner is maximum when the cab 110a or trailer 120 is pitch up relative to the other causing the upper corner of the trailer to be the closest to the tractor/cab. The top portion 145c is movable or rotatable relative to the lateral portions 145a, 145b via a hinge 147. In another example, the top portion 145c may be a raised central portion (also referred to as a "bubble") that is fixed relative to lateral portions 145a, b to facilitate trailer 120 clearance. This example is described below relative to FIGS. 9-10.

The top portion 150c can be movable or rotatable relative to the lateral portions 150a, b. The top portion 150c is movable or rotatable relative to the lateral portions 150a, b via a hinge 152. When moving from the retracted state of FIG. 3A to the deployed state of FIG. 3B, the movable top portion 150c rotates rearward and moves upward (by virtue of the movement of swing arms 160) synchronously with rearward rotation and downward movement of the top portion 145c of the movable fairing assembly to cover, partially cover, of substantially completely cover/enclose the central portion of the tractor-trailer gap 140 when the device is extended/deployed at speed, providing a continuous or semi-continuous top surface. In this regard, the top portion 145c rotates rearward and moves downward in synchronicity with the rearward rotation and upward movement of the top portion 150c. Synchronous can refer to movement of the top portion 150c and movement of the top portion 145c can, at least partially, overlap in time. The movable top portion 150c could be biased in rotation upward (beyond horizontal) to better facilitate trailer 120 clearance during turning, or could offer compliance and be pushed out of the way during articulation.

In another example, either or both of the top portions 145c or 150c can be manufactured from a compliant material to enable trailer interference without damage, while still holding its shape for aerodynamic functional purposes.

Advantageously, the top portions 145c and 150c combine to at least partially, substantially completely, or completely, cover or enclose a top portion of the gap 130, maximizing trailer envelope and gap coverage. This coverage also occurs where a rectangular profile of the cab 110 is different than a rectangular profile of the trailer 120. In this way, the top portions 145c and 150c have an upward taper to account for the trailer profile being larger than the cab profile (in addition to the continuously tapered surfaces of respective lateral portions 145a,b and 150a,b). In an example, the top portions 145c and 150c can combined to form a continuous or substantially continuous surface between cab 110 and trailer 120 and can be a continuous or substantially continuous tapered surface. The taper is depicted generally in FIG. 3B, in which the taper is directed upward relative to a longitudinal axis of the tractor trailer 100. The taper can be achieved in examples where the trailer 120 has a height that is equal to or greater than a height of the cab 110a of trailer 110.

Figure 4A:
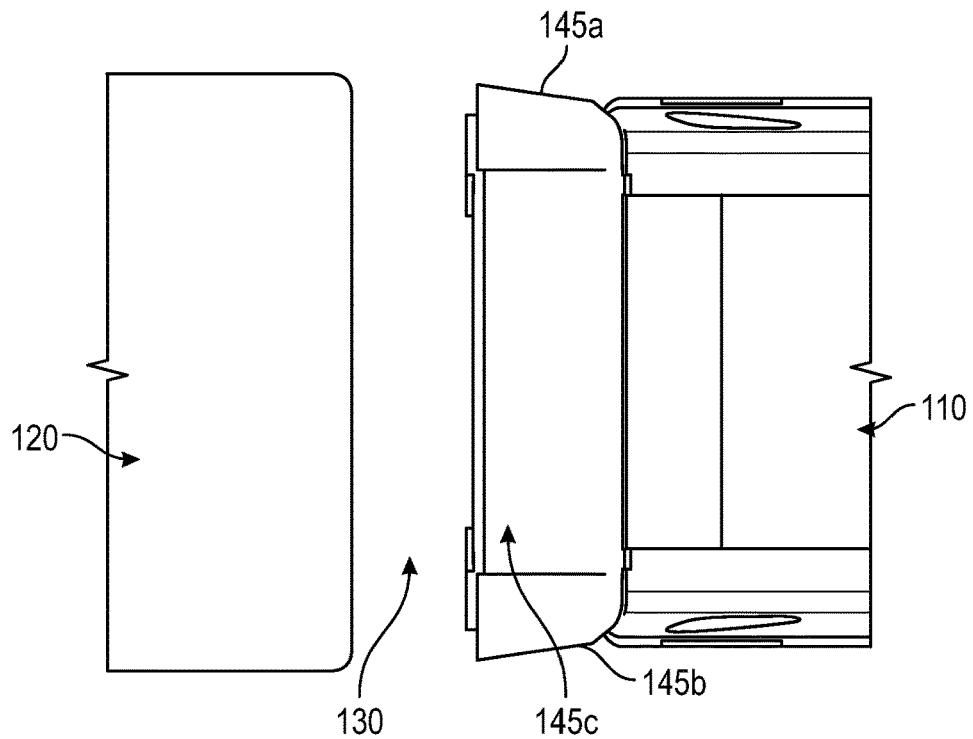
FIG. 4A is a top view of a tractor-trailer with a fairing system in a retracted state.
Figure 4B:
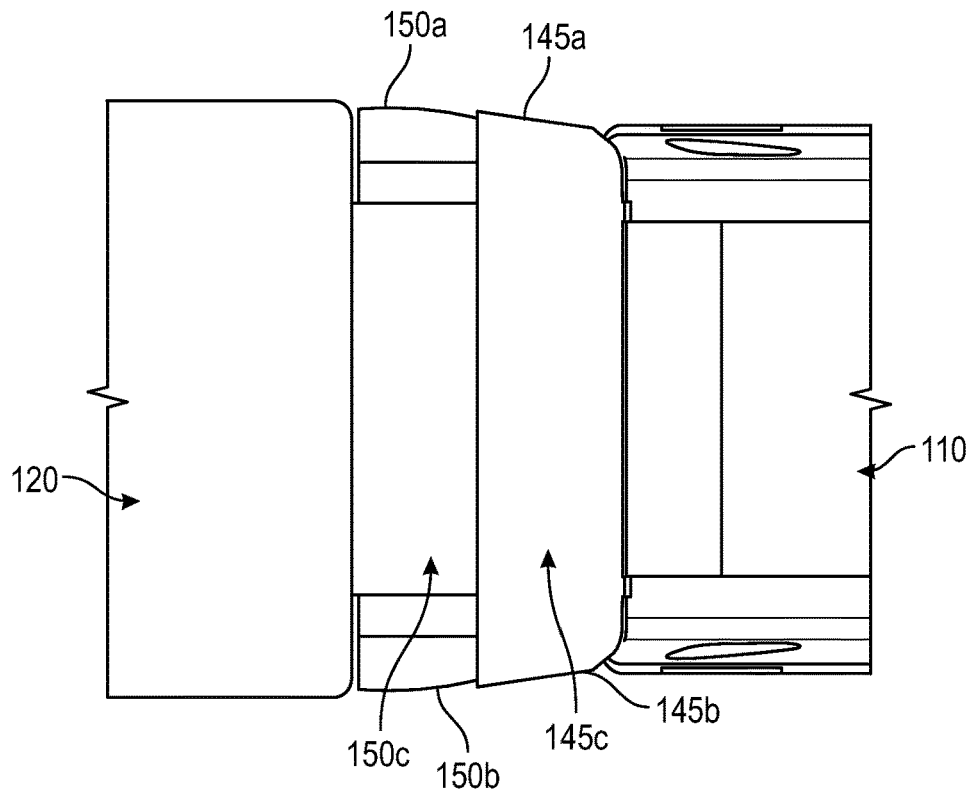
FIG. 4B is a top view of a tractor-trailer with a fairing system in a deployed state.

FIG. 4A is a top view of a tractor-trailer with a fairing system in a retracted state and FIG. 4B is a top view of a tractor-trailer with a fairing system in a deployed state.

The lateral portions 145a, 145b or 150a, 150b may include aerodynamic surfaces that are primarily vertical and fill in the sides of the tractor-trailer gap, but extend around and transition into horizontal surfaces at the top portion 145c and top portion 150c respectively such that they partially cover the top of the tractor-trailer gap 130. The lateral portions 150a, 150b can be connected to each other with a translating joint (e.g., hinge 152) that positions a top portion 150c relative to the lateral portions 150a, 150b. The top portion 150c moves rearward and upwardly with the lateral portions 150a, 150b while rotating downward synchronously at the trailing edge with the top portion 145c of the fixed fairing assembly 145. In an example, the movable top portion 150c and/or the top portion 145c is arranged so as to be biased in rotation upward to better facilitate trailer clearance during turning when the movable fairing assembly 150 is retracted.

In another example, the top portion 150c of the movable fairing assembly 150 can include a raised central portion or "bubble" to facilitate trailer clearance. In this example, the top portion 150c (e.g., the "bubble" portion) would translate rearward with the lateral portions 150a 150b, but would not rotate upward. This example is further described below with respect to FIG. 10.

Additionally, the top portion 150c can be manufactured from a compliant material to enable trailer interference without damage, while still holding its shape for aerodynamic functional purposes.

The shape of the portions 150a, 150b, 150c that make up the movable fairing assembly 150 can be optimized to work with the airflow coming off of the fixed fairing assembly 145 and may partially overlap or not overlap at all with the fixed fairing assembly 145 depending on the gap to be filled, the tuned aerodynamic performance of the total system, and the speed of the tractor.

The lateral portions 145a, 150b and 150a, 150b, as shown in FIG. 4B, combine to form a continuously (or substantially continuously) outwardly tapered surface from cab 110a of tractor 110 to trailer 120. In an example, the portions 145a, 150b and 150a, 150b can combine to form a substantially continuously outwardly tapered surface, which includes configurations whereby the surfaces includes one or more discontinuities, but the coverage is sufficient to prevent appreciable airflow into/out of the gap 130 in a manner that substantially improves aerodynamics and fuel efficiency.

As also shown, the top portions 145c and 150c at least partially, substantially completely, or completely cover or enclose a top dimension of the gap 130. The combination of portions 145a-c and 150a-c provide for at least partial, complete, or substantially complete coverage of the gap 130 relative to side and top dimensions thereof.

FIG. 5A is a top view of a tractor-trailer 100 and reefer 165 with an articulated trailer 120 relative to the cab 110a of the tractor 110 with a fairing system 140 in a deployed state and FIG. 5B is a rear perspective view of a tractor-trailer and reefer 165 with an articulated trailer relative to the cab with a fairing system in a deployed state.

As depicted, the trailer 120 includes a reefer 165. During a turn or other driving maneuver, the trailer 120 can articulate relative to the cab 110. In this manner, the corner 165a of the reefer is closest to the cab 110 when the trailer is articulated at approximately 45 degrees. As shown in FIG. 5B, the reefer 165 and the trailer 120 clear the fairing system 140 (including fixed and movable fairing assemblies 145 and 150). Clearance is achieved in any of the examples of fairing assembly described herein, including any combination of top portion 145c being movable or fixed relative to lateral portions 145a, 150b and/or top portion 150c being movable or fixed relative to lateral portions 150a, 150b. In an example where the top portion 145c and the top portion 150c are both movable, a corner 165a, other portion of the reefer 165, or the trailer 120 can make contact with the top portion 150c, causing an upward movement of the top portion 150c and top portion 145c and providing clearance.

Figure 6A:
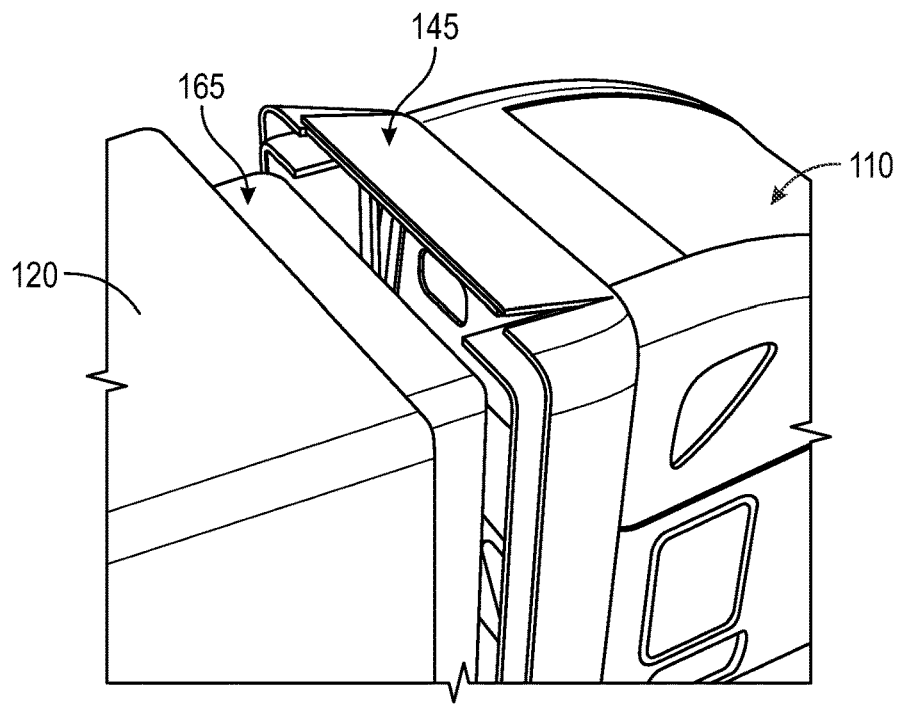
FIG. 6A is a rear perspective view of a tractor-trailer and reefer unit with a fairing system in a retracted state.
Figure 6B:
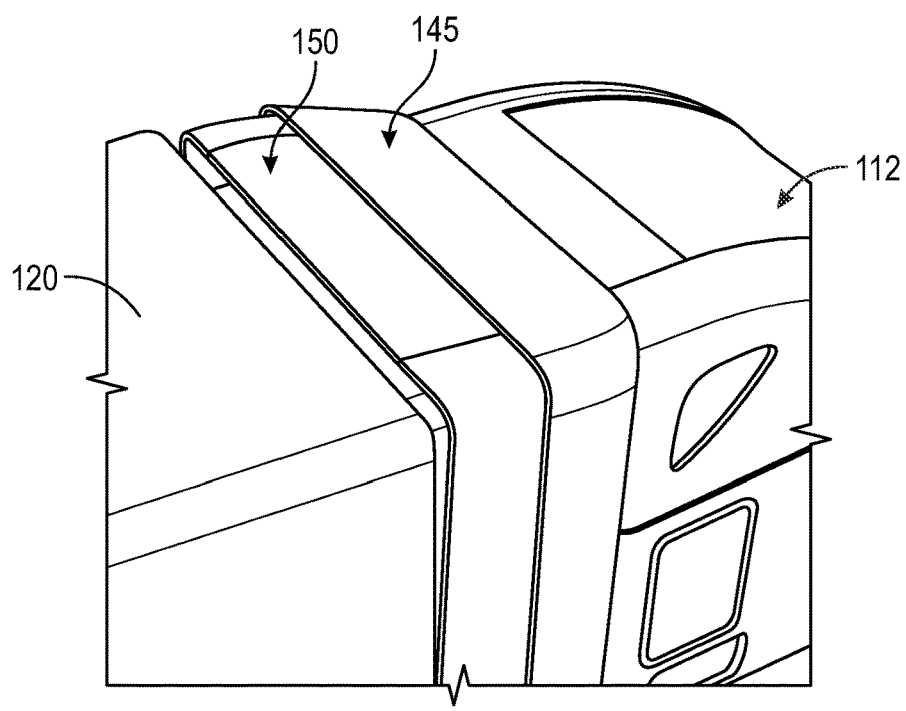
FIG. 6B is a rear perspective view of a tractor-trailer and reefer unit with a fairing system in a deployed state.
Figure 7A:
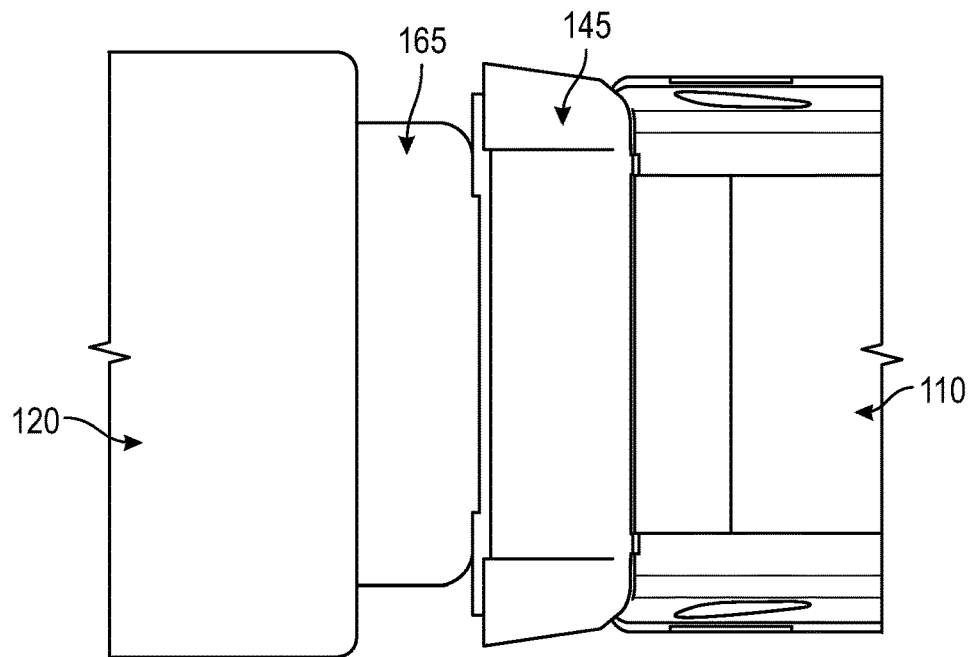
FIG. 7A is a top view of a tractor-trailer and reefer unit with a fairing system in a retracted state.
Figure 7B:
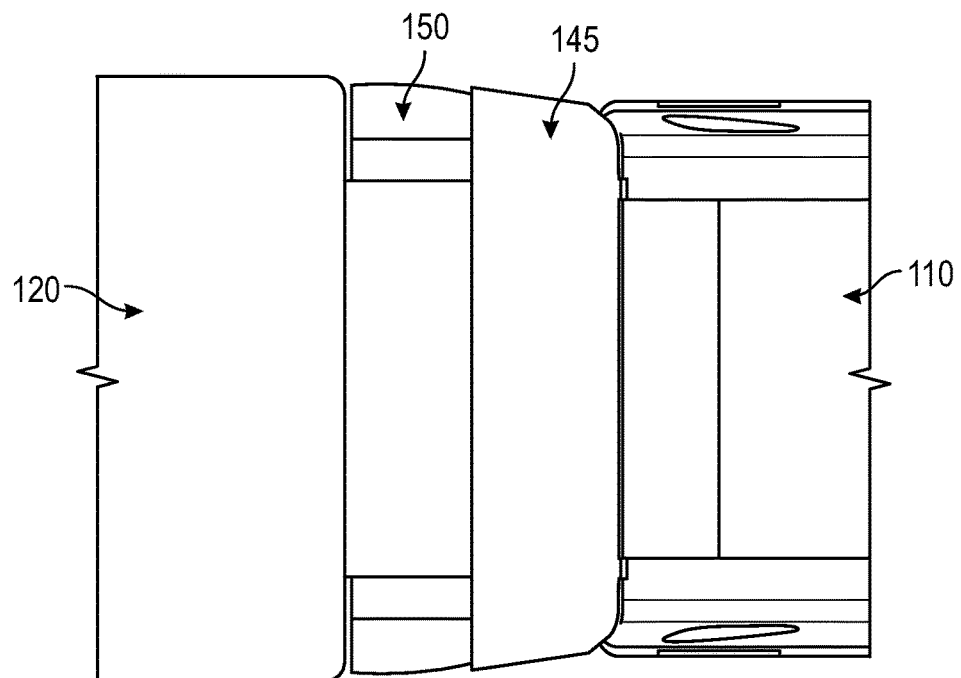
FIG. 7B is a top view of a tractor-trailer and reefer unit with a fairing system in a deployed state.

FIG. 6A is a rear perspective view of a tractor-trailer and reefer unit with a fairing system in a retracted state and FIG. 6B is a rear perspective view of a tractor-trailer and reefer unit with a fairing system in a deployed state. FIG. 7A is a top view of a tractor-trailer and reefer unit with a fairing system in a retracted state and FIG. 7B is a top view of a tractor-trailer and reefer unit with a fairing system in a deployed state.

In the retracted state of FIGS. 6A and 7A, the reefer 165 is positioned within the gap 130, or at least partially defines the gap. As the fairing system 110 moves from the retracted state to the deployed state of FIGS. 6B and 7B, the gap 130 is partially, substantially completely, or completely covered by the fairing system 140, including fixed and movable fairing assemblies 145 and 150.

Figure 8A:
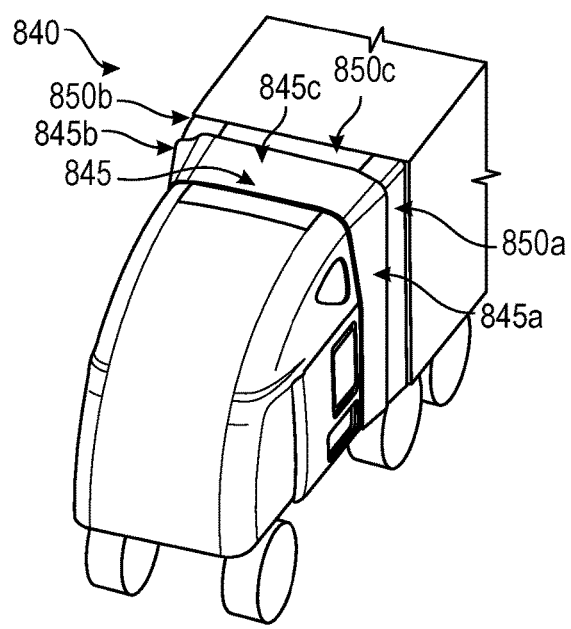
FIG. 8A is a front perspective view of a tractor-trailer with a fairing system in a deployed state.
Figure 8B:
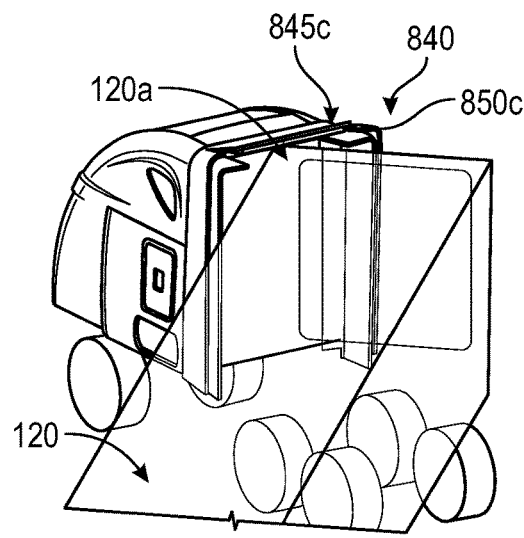
FIG. 8B is a rear perspective view of a tractor-trailer with an articulated trailer relative to the cab with a fairing system in a deployed state.

FIG. 8A is a front perspective view of a tractor-trailer with a fairing system 840 in a deployed state and FIG. 8B is a rear perspective view of a tractor-trailer with an articulated trailer relative to the cab with a fairing system in a deployed state.

In this example, each of the top portions 845c and 850c are both movable. That is to say, the top portion 845c is movable or rotatable relative to lateral portions 845a, b and the top portion 850c is movable or rotatable relative to lateral portions 850a, b. In this way, where the trailer articulates as shown in FIG. 8B, a corner 120a of the trailer 120 can contact the top portion 850c and impart an upward and horizontal force thereon. This force causes the top portion 850c to move upward and frontward, and subsequently contact and cause the top portion 845c to synchronously move to provide clearance for the corner 820a and trailer 820. In an example, the top portions 145c and 150c can move synchronously. In some examples, the top portions 145c and 150c can be biased upward while the fairing assembly 840 is retracted to provide clearance.

Figure 9A:
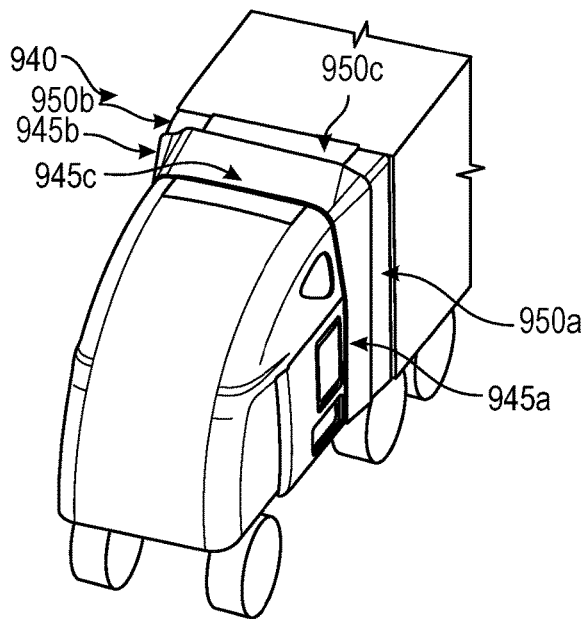
FIG. 9A is a front perspective view of a tractor-trailer with a fairing system in a deployed state.
Figure 9B:
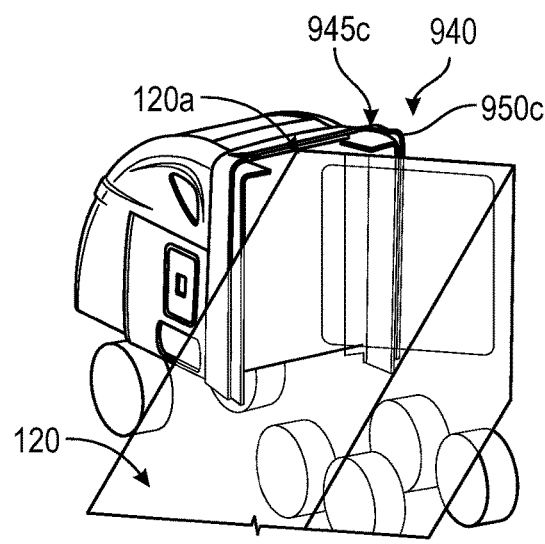
FIG. 9B is a rear perspective view of a tractor-trailer with an articulated trailer relative to the cab with a fairing system in a deployed state.

FIG. 9A is a front perspective view of a tractor-trailer with a fairing system in a deployed state and FIG. 9B is a rear perspective view of a tractor-trailer with an articulated trailer relative to the cab with a fairing system in a deployed state.

In this example, the top portion 945c is fixed (stationary) relative to the lateral portions 945a, 945b and the top portion 950c is movable relative to the lateral portions 950a, b. In this way, where the trailer articulates as shown in FIG. 9B, a corner 120a of the trailer 120 can contact the top portion 950c and impart an upward and horizontal force thereon. This force causes the top portion 950c to move upward and frontward into a motion envelope defined by the top portion 945c to provide clearance for the corner 120a and trailer 120.

Figure 10A:
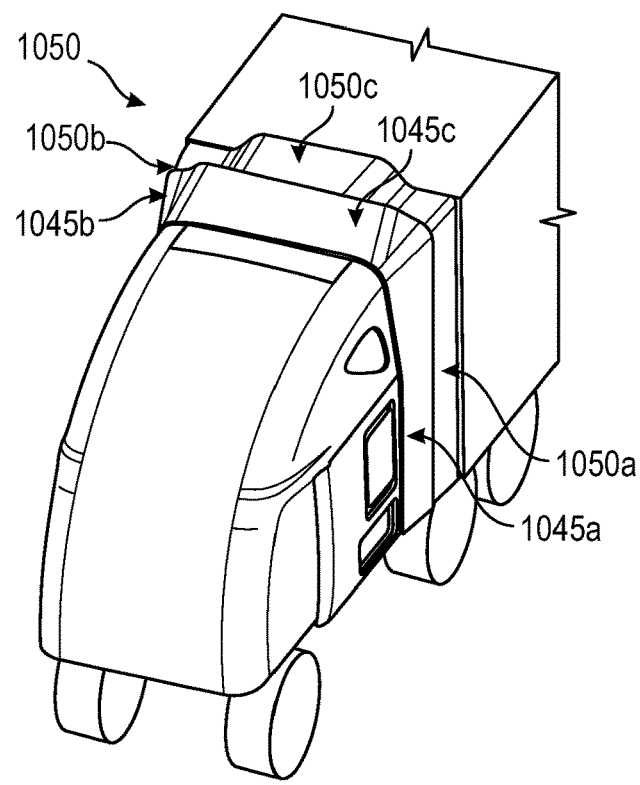
FIG. 10A is a front perspective view of a tractor-trailer with a fairing system in a deployed state.
Figure 10B:
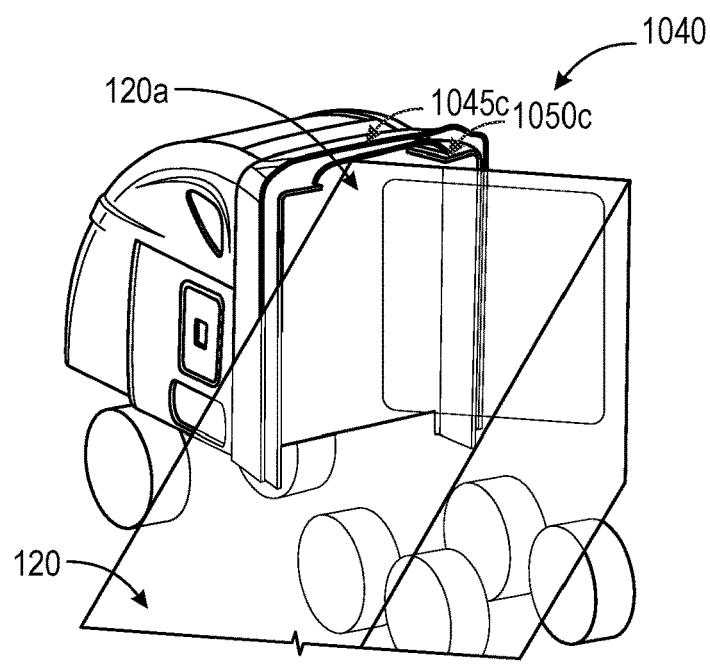
FIG. 10B is a rear perspective view of a tractor-trailer with an articulated trailer relative to the cab with a fairing system in a deployed state.

FIG. 10A is a front perspective view of a tractor-trailer with a fairing system 1040 in a deployed state and FIG. 10B is a rear perspective view of a tractor-trailer with an articulated trailer relative to the cab with a fairing system in a deployed state.

In this example, the top portion 1045c is fixed (stationary) relative to the lateral portions 1045a, b and the top portion 1050c is fixed (stationary) relative to the lateral portions 1050a, b. In this way, where the trailer articulates as shown in FIG. 10B, a corner 120a of the trailer 120 moves into a motion envelope defined by the top portion 150c. The top portion 1050c is within a motion envelope defined by top portion 1045c and provides clearance for the corner 120a and trailer 120.

Figure 11:
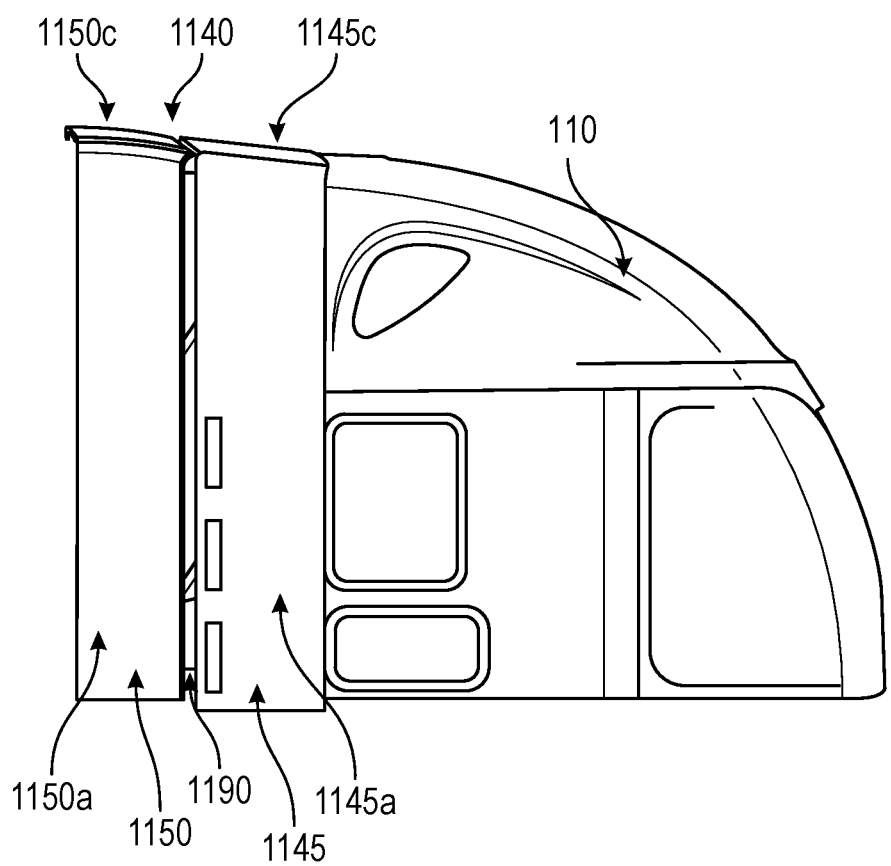
FIG. 11 is a side view of a tractor-trailer cab with a fairing system in a hyperextended deployed state.

FIG. 11 is a side view of a tractor-trailer (trailer not shown) cab with a fairing system 1140 in a hyperextended deployed state. In this example, the movable fairing assembly 1150 (including lateral portion 1150a and top portion 1150c) can move to a position where the gap 130 is substantially covered by the combination of movable fairing assembly 1150 and fixed fairing assembly 1145 (including lateral portion 1145a and top portion 1145c), defining a gap 1190 between the assemblies 1145 and 1150. In this regard, the hyperextended deployed state can cover a gap having a greater longitudinal length, but can provide substantial aerodynamic and fuel efficiency benefits. In one particular example, the assemblies 1145 and 1150 combine to substantially completely cover the gap 130, defining gap 1190, whereby the coverage is sufficient to prevent appreciable airflow into/out of the gap 130 in a manner that substantially improves aerodynamics and fuel efficiency.

Figure 12:
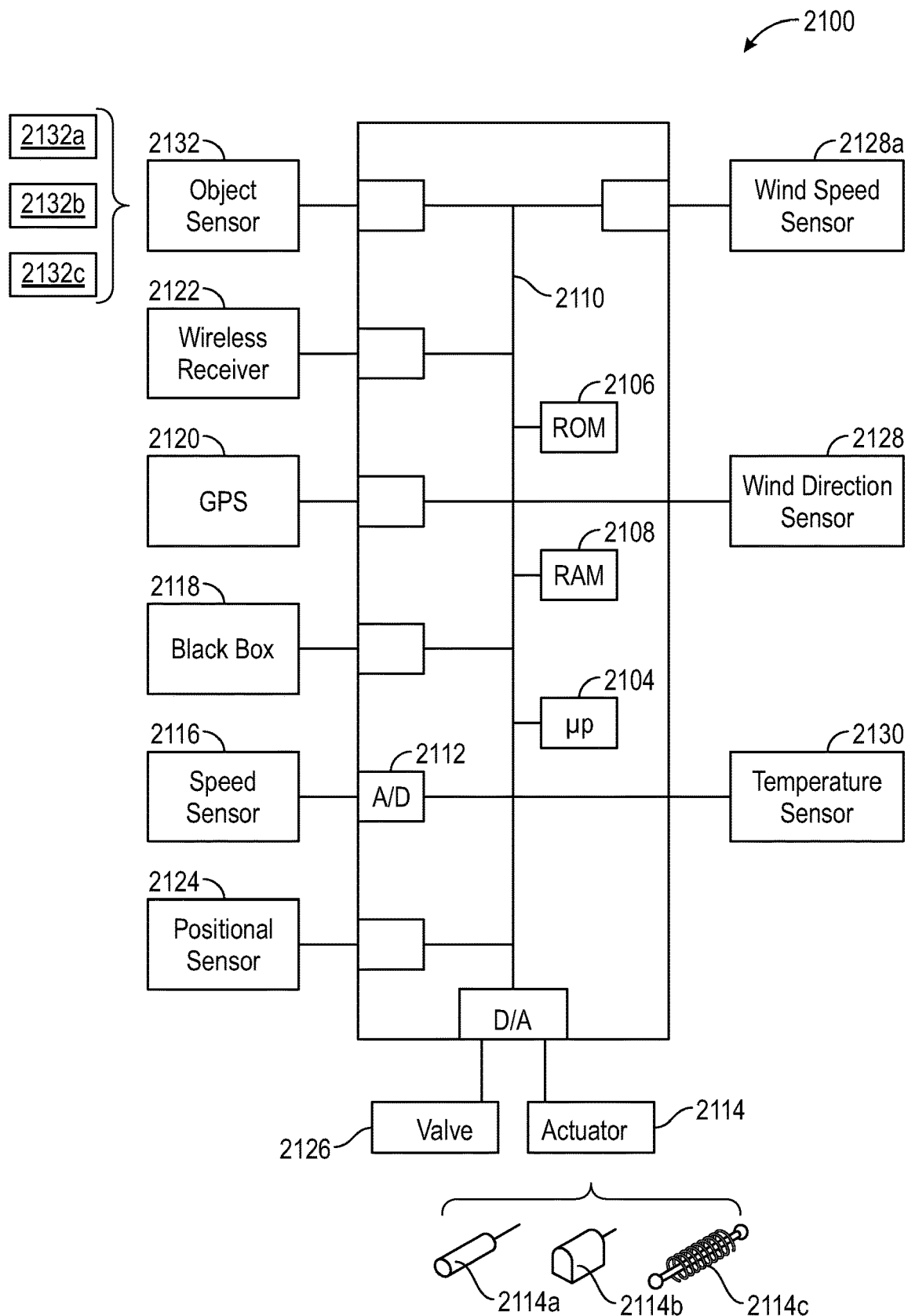
FIG. 12 is a computer system for controlling a fairing system according to one or more aspects of the disclosure.

FIG. 12 shows a control subsystem 2100 for a fairing system according to an illustrated embodiment.

The control subsystem 2100 is configured to automatically selectively move a movable fairing assembly 150 between a fully un-deployed or fully unextended configuration and a fully deployed or fully extended configuration, and optionally one or more partially deployed or intermediate configurations based on one or more conditions (e.g., speed of vehicle, location of vehicle, presence or absence of any obstacles in path of deployment, wind speed and/or wind direction, and/or temperature in an ambient environment.

The control subsystem 2100 can include a controller 2102. The controller 2102 may include one or more hardware or circuitry-based processors (e.g., microprocessor, digital signal processor, programmable gate array, application specific integrated circuit, microcontroller) 2104. The controller 2102 may include one or more processor-readable media for example memories or other storage mediums. For example, the controller 2102 may include read only memory 2106 and/or random access memory 2108. The memories 2106, 2108 may store processor executable instructions that cause the processor 2104 to assess speed, location, or one or more thresholds, and to control a configuration or position of the movable fairing 150 in response thereto.

The controller 2102 may include one or more busses 2110 coupling the processor 2104 and memories 2106, 2108. For example, the controller 2102 may include a power bus, instruction bus, data bus, address bus, etc. The busses can also provide signal paths to communicate with other devices or elements of the control subsystem 2100. The control subsystem 2100 may also include one or more digital-to-analog (D/A) converters 2110 to convert digital signals from the processor 2104 into an analog form suitable to drive certain components. The control subsystem 2100 may also include one or more analog-to-digital (A/D) converters 2112 to convert analog signals from certain components into a digital form suitable for processing by the processor 2104.

The control subsystem 2100 may include one or more actuators 2114 operable to move the movable fairing 150 between the fully un-deployed or fully retracted or fully unextended configuration and the fully extend or a fully deployed configuration, and optionally into any one or more of a number of partially deployed or partially extended configurations between the fully un-deployed and fully deployed configurations. As previously explained, the actuator(s) 2114 may, for example, take the form of a piston/cylinder pair 2114a, a solenoid 2114c, and/or an electric motor (e.g., stepper motor) 2114c, or the airbag depicted in FIGS. 2A-B. In addition, at least one valve 2126 may be attached to or incorporated into the actuator 2114, e.g., a piston cylinder 2114a. The valve 2126 may be a mechanical control valve, a solenoid, or other like device that can selectively vent the actuator 2114 or provide a fluid (e.g., air, hydraulic fluid) under an elevated pressure. In the event of an error or a loss of power, the valve 2126 can be biased in the event of a power loss to deactivate the actuator 2114 such as, for example, by venting the air within a pneumatic actuator or hydraulic fluid. In this situation, the components of the movable fairing assembly 150 default to returning to the fully retracted or fully unextended configuration as a result of the components of the movable fairing assembly 150 applying a downward force to the deactivated actuator 2114. In some implementations, the control subsystem 2100 may control the actuator 2114, such as through controlling a fluid supply, to cause the actuator 2114 to retract the lateral portion 150a to elastically deform the lateral portion 150a without causing plastic deformation to the lateral portion 150a or the top portion 150c. In some implementations, the control subsystem 2100 may control the actuator 2114, such as through controlling a fluid supply, to cause the actuator 2114 to retract the lateral portion 150b to elastically deform the lateral portion 150b without causing plastic deformation to the lateral portion 150b or the top portion 150c.

The valve 2126 can be arranged so that when it is biased it deactivates the actuator 2114 in various conditions, resulting in the components of the movable fairing assembly 150 automatically returning to the fully retracted or fully unextended configuration. Such conditions may arise, for example, in the event of a power loss to the tractor-trailer 100 or to the fairing system 140, or in the event that the fairing system 140 is unable to communicate with the rest of the control subsystem 2100, including the processor 2104. In addition, such conditions may arise when one or more gauges or sensors indicate a potentially unsafe operating condition. Additionally or alternatively, some conditions may indicate that it may be efficient or desirable to transition the movable fairing 150 into a partially deployed or partially extended (e.g., intermediate) configuration, for example as explained elsewhere herein.

The control subsystem 2100 may include one or more speed sensors 2116, which provide signals indicative or representative of a speed of the vehicle to the processor(s) 2104, either directly or indirectly. The speed sensor 2116 (e.g., rotational encoder, Reed switch) may be an integral part of the tractor-trailer 100 as manufactured by the vehicle manufacturer, used as part of the speedometer of the tractor-trailer 100. Alternatively, the speed sensor 2116 may be added later, e.g. as a retrofit. In some implementations, the speed sensor 2116 is a dedicated part of the control subsystem 2100 and is unrelated to, or not part of, the conventional feedback system (e.g., speedometer) of the tractor-trailer 100.

The processor(s) 2104 may receive signals indicative or representative of speed from an on-board computer 2118 associated with the tractor-trailer 100. In an example, the on-board computer can be a truck engine management system configured to monitor one or more parameters of the vehicle. These on-board computers track various parameters of operation such as speed, distance, total time, elapsed time, and/or location. In an example, the truck engine management system and the processor(s) 2104 can obtain any/all parameters available including speed, temperature, gear, power, throttle position, fuel consumption, fuel rate, and brake pressure and position. In another example, the on-board computer may be a black box configured to receive and store one or more vehicle parameters.

The processor(s) 2104 may receive signals indicative or representative of speed from a global positioning system (GPS) receiver 2120. The (GPS) receiver 2120 may determine location information indicative or representative of a current location of the tractor-trailer 100. The processor may be configured to associate the location information with a particular road or section of road, and hence with a posted speed limited or expected speed of travel for the tractor-trailer 100. For example, the processor 2104 may be configured to determine whether the tractor-trailer 100 is on a highway or a surface street based on the location information.

The processor(s) 2104 may receive signals indicative or representative of speed or location from a wireless receiver 2122. The wireless receiver 2122 may be part of the control subsystem 2100, or may be a dedicated part of the tractor-trailer 100. The wireless receiver 2122 may determine speed information or location information indicative or representative of a current speed or location of the tractor-trailer 100. For example, the wireless receiver 2122 may receive information indicating that the tractor-trailer 100 is at an entrance ramp or exit ramp of a highway, or at a toll booth or toll plaza associate with an entrance or exit of a highway. Additionally, or alternatively, the information may indicate another location along a highway or surface street. The location information may itself be indicative or representative of a posted speed. Additionally or alternatively, the received information may provide a measure of the actual speed of the tractor-trailer 100, for example as measured by radar or laser speed sensors positioned along the road. The processor may be configured to associate the location information with a particular road or section of road, and hence with a posted speed limit or expected speed of travel for the tractor-trailer 100. For example, the processor 2104 may be configured to determine whether the tractor-trailer 100 is on a highway or surface street based on the location information.

Additionally, the control subsystem 2100 may include one or more positional or orientation sensors 2124 which provides signals to the one or more processor(s) 2104 indicative or representative of the current positions or orientations of one or more components of the movable fairing assembly 150, such as, for example, the lateral portions 150a, b and top portion 150c. The positional or orientation sensors 2124 may be, for example, a proximity sensor, a Reed switch, a positional encoder, a rotational encoder, an optical encoder, or other like device that can sense the position or orientation of one or more components in the movable fairing 150. The processor(s) 2104 may be configured to determine a correct position or orientation for each of the components of the movable fairing 150 in each of various configurations (e.g., fully retracted or fully unextended configuration, intermediate configurations, and fully deployed or fully extended configuration). The processor(s) 2104 may further be configured compare the current position or orientations for each component of the movable fairing 150 as indicated by the signals received from the positional or orientation sensors 2124 with the expected configuration or position for each component of the movable fairing assembly 150 to identify a potential error condition. Such an error condition may arise, for example, if the current configuration or position or orientation of one or more of the components of the movable fairing assembly 150 differs from the expected configuration or position or orientation for the one or more components. In some implementations, a time out period, such as may be stored in memories 2106, 2108, may be used to determine if the movable fairing assembly 150 has successfully transitioned from the fully retracted or un-deployed configuration to the fully extended or fully deployed configuration or some intermediate configuration therebetween. If the processor 2104 determines that such an error condition exists (e.g., the positional sensors 2124 indicate that one or more components of the movable fairing assembly 150 have not reached the expected positions or orientations in the fully or partially deployed configuration within the timeout period), the processor may transition the movable fairing assembly 150, if necessary, into the fully retracted or full un-deployed configuration.

The control subsystem 2100 may include one or more object sensors 2132 positioned and oriented to monitor regions in which a deployable fairing will deploy (i.e., deployed region), or alternatively encompass, when in the fully deployed or fully extended configuration. The deployed region may in some instances encompass or be encompassed by a gap region between two coupled vehicles (e.g., coupled tractor trailer combination). The deployed region may in some instances only those volumes in which a portion of the deployable fairing will reside when fully deployed or fully extended, for instance omitting a large central volume the is encompassed by the fully deployed fairing but which no fairing structure will reside. This allows a more refined determination of whether or not full deployment of the deployable fairing may cause a collision with some obstacle (e.g., structure on the trailer), where collision may result in damage to the fairing or even to the object or obstacle.

The object sensor(s) 2132 are communicatively coupled to provide signals to the processor(s) 2104, either directly or directly, indicative or representative of whether there is an object or obstacle in the deployed region. In some implementations the object sensors will determine whether an object or obstacle is present or absent from the deployed region. In some implementations the processor(s) 2104 will determine whether an object or obstacle is present or absent from the deployed region.

The object sensor(s) 2132 can any of a variety of forms. For example, the object sensor(s) 2132 can include any one or more of: distance sensors 2132a, proximity sensors 2132b, image sensors 2132c. Distance sensors may, for example, include one or more of: laser range finders, distance measuring devices or sensors. Proximity sensors may, for example, include one or more of: ultrasonic sensors, capacitive sensors, photoelectric sensors, inductive sensors or a magnetic sensors. Image sensors may, for example, include single digital cameras, binocular digital cameras, Vidicons, CMOS based image sensors, etc. It may be advantageous in some implementations to include at least one sensor of a first type of sensor and at least one sensor of a second type of sensor, the second type of sensor different from the first type of sensor.

The control subsystem 2100 may include one or more environmental sensors.

For example, the control subsystem 2100 may include one or more wind sensors 2134a, 2134b that detect wind speed, relative wind direction or both. The wind sensors 2134a, 2134b are communicatively coupled to provide signals to the processor(s) 2104 indicative or representative of wind speed (e.g., magnitude) and/or relative wind direction (e.g., cross wind relative to the vehicle). In some implementations, the wind sensors 2134a, 2134b determine the wind speed and the wind direction and provide that information to the processor(s) 2104. In other implementations, the processor(s) 2104 determines the wind speed and/or the wind direction from information provided by the wind sensors 2134a, 2134b.

For example, the control subsystem 2100 may include one or more temperature sensors 2136 position to determine a temperature in an ambient environment in which the vehicle is operating. The temperature sensors can take a variety of forms, for example thermocouples. The temperature sensors 2136 are communicatively coupled to provide signals to the processor(s) 2104 indicative or representative of temperature. In some implementations, the temperature sensors 2136 determines the temperature and provides that information to the processor(s) 2104. In other implementations, the processor(s) 2104 determines the temperature from information provided by the temperature sensors 2136.

In one implementation, the processor(s) 2014 use information from the object sensor(s) 2132 to determine whether the deployment region has any objects or obstacles that would hinder deployment or even result in damage. Such may be assessed for example before the start of a trip, for instance when a trailer is coupled to a tractor. This approach advantageously allows the system to accommodate various styles of trailer (e.g., reefer). Additionally or alternatively, such may be assessed one or more times during a trip, for instance periodically or in response to a change in conditions. This approach advantageously allows the system to accommodate any travel in the fifth wheel.

In operation, if the processor(s) determines that any object or obstacle is present, the processor can determine that deployment of the deployable fairing should either be prevented or limited to an intermediate configuration. Such determination may be based at least in part on a position or location of the object or obstacle. Deployment into an intermediate configuration means moving the deployable fairing to the intermediate configuration, or leaving the deployable fairing in the intermediate configuration, and stopping the deployment in the intermediate configuration. This is to distinguish over simply transitorily passing through an intermediate configuration while deploying to the fully deployed or fully retracted configurations.

In some implementations, the presence or absence of an object or obstacle in the deployment region is the only factor considered in determining whether to deploy the deployable fairing and into which configuration the deployable fairing will be deployed. Thus, the processor(s) 2014 may determine to deploy the deployable fairing to an intermediate configuration that places a distal end of the deployable fairing close, but short of the object or obstacle, for example leaving a safety margin to limit or eliminate the chance of damage.

In other implementations, the determination may take into account a variety of other factors, for example factors related to enhancing fuel efficiency. Factors may include vehicle speed, braking or change in vehicle speed, wind speed, wind direction and/or temperature in the ambient environment.

For example, a speed sensor 2116, discussed herein, may provide a signal indicating that the tractor-trailer 100 is traveling at a relatively high speed, such as may occur when the tractor-trailer 100 is traveling over a highway or freeway. Alternatively, the processor(s) 2104 may rely on location instead of, or in addition to, vehicle speed in determining whether to deploy the deployable fairing. In this situation, the processor(s) 2104 may determine if the speed indicated by the signal from the speed sensor 2116 falls above a threshold speed value stored in memories 2106, 2108 or whether a present location corresponds to a highway versus a surface street. If the speed is above the threshold or the location corresponds to a highway, the processor(s) 2104 determines to deploy the deployable fairing. The extent of deployment may depend on whether an object or obstacle is present in the deployment region. The processor(s) 2104 sends signals to control the valve 2126 to activate the actuator 2114 to deploy the deployable faring into the fully deployed configuration, or alternatively into an intermediate configuration if an object or obstacle is present. In these modes of operation, the processor(s) 2014 may perform a real-time assessment of whether there is an object or obstacle in the deployment region, and/or may rely on a previously stored assessment, for instance an assessment when a trailer is first coupled to a tractor.

Also for example, the speed sensor 2116, discussed herein, may provide a signal indicating that the tractor-trailer 100 is traveling at a low speed, such as may occur when the tractor-trailer 100 is traveling over surface streets. Alternatively, the processor(s) 2104 may rely on location, determining that the vehicle is on a surface street or not on a highway or freeway. In this situation, the processor 2104 may determine if the speed indicated by the signal from the speed sensor 2116 falls below a threshold speed value stored in memories 2106, 2108. If the vehicle speed is below the threshold speed or the current position indicates that the vehicle is on a surface street or parking lot, then the valve 2126 may be used to deactivate the actuator 2114.

The processor 2104 may optionally receive signals from various other sensors that result in the valve 2126 being used to activate or deactivate the deployable fairing 16. For example, the processor 2104 may receive signals from one or more wind sensors, for instance one or more wind speed sensors 2128a, and/or one or more wind direction sensors 2128b indicating a speed and direction of wind, for instance a strength of a cross wind. The processor 2104 may determine whether the wind speed and/or direction exceed a cross wind threshold. For example, the processor 2104 may receive signals from one or more a temperature sensors 2130, indicating a temperature of the environment around the actuator 2114. The processor 2104 may determine whether the sensed temperature falls below a low temperature threshold or exceeds a high temperature threshold. In some implementations, the processor 2104 may use the valve 2126 to activate or deactivate the actuator 2114.

The processor(s) 2104 then determines which intermediate configuration is safe, and sends signals to one or more actuators to deploy the deployable faring to the identified intermediate configuration, stopping in the intermediate configuration.

Whether independent of vehicle speed or in conjunction with vehicle speed, the processor(s) 2104 may determine to deploy the deployable fairing in response to wind speed, wind direction and/or temperature in the ambient environment. In each instance, the processor(s) 2104 may determine to not deploy the deployable fairing or to move the deployable fairing to the fully retracted or fully un-deployed configuration is an objector or obstacle is present in the deployment region. Alternatively, the processor(s) 2104 may determine which intermediate configuration is safe in light of the presence of an object or obstacle in the deployment region, and sends signals to one or more actuators to deploy the deployable faring to the identified intermediate configuration.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, although a tractor-trailer is depicted, the fairing system can be implemented into any kind of vehicle having a cab and a trailer. Additionally, as used herein, the terms "process" and/or "processor" should be taken broadly to include a variety of electronic hardware and/or software based functions and components (and can alternatively be termed functional "modules" or "elements"). Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, as used herein various directional and dispositional terms such as "vertical", "horizontal", "up", "down", "bottom", "top", "side", "front", "rear", "left", "right", and the like, are used only as relative conventions and not as absolute directions/dispositions with respect to a fixed coordinate space, such as the acting direction of gravity. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A fairing system, comprising:
   a fixed fairing assembly configured to attach to a cab of a tractor-trailer, the fixed fairing assembly being a unitary assembly and comprising a first lateral portion, a second lateral portion, and a movable top portion;
   a movable fairing assembly configured to attach to at least one of the fixed fairing assembly or the cab of the tractor-trailer; and
   an actuator assembly configured to move the movable fairing assembly relative to the fixed fairing assembly.

2. The fairing system of claim 1, wherein the fixed fairing assembly is configured to be at least one of: removably attached to the cab of the tractor-trailer; or permanently attached to the cab of the tractor-trailer.

3. The fairing system of claim 1, wherein the fixed fairing assembly and the movable fairing assembly are configured to substantially completely enclose a gap defined between the cab and a trailer of the tractor-trailer.

4. The fairing system of claim 1, wherein the movable fairing assembly is configured to be at least one of: removably attached to the cab of the tractor-trailer; permanently attached to the cab of the tractor-trailer; removably attached to the fixed fairing assembly; or permanently attached to the fixed fairing assembly.

5. The fairing system of claim 1, wherein the actuator assembly is configured to move the movable fairing assembly from an undeployed position to a deployed position.

6. The fairing system of claim 1, wherein the actuator assembly is configured to move the movable fairing assembly to at least one intermediate position between the undeployed position and the deployed position.

7. A fairing system, comprising:
a fixed fairing assembly configured to attach to a cab of a tractor-trailer;
a movable fairing assembly configured to attach to at least one of the fixed fairing assembly or the cab of the tractor-trailer, the movable fairing assembly configured to move from an undeployed position to a deployed position in which the fixed fairing assembly and at least one lateral portion of the movable fairing assembly forms a continuously outwardly tapered surface from a rear of the cab to the trailer; and
an actuator assembly configured to move the movable fairing assembly relative to the fixed fairing assembly.

8. The fairing system of claim 7, wherein the at least one lateral portion comprises a plurality of lateral portions.

9. A fairing system configured to attach to a cab of a tractor-trailer, the cab having a first rectangular cross-sectional profile and a trailer of the tractor-trailer having a second, larger, rectangular cross-sectional profile, the fairing system comprising:
a fixed fairing assembly configured to attach to a cab of a tractor-trailer;
a movable fairing assembly configured to attach to at least one of the fixed fairing assembly or the cab of the tractor-trailer, the movable fairing assembly configured to move from an undeployed position to a deployed position in which the fixed fairing assembly and the movable fairing assembly form a continuously tapered surface from the first rectangular cross-sectional profile to the second, larger, rectangular cross-sectional profile; and
an actuator assembly configured to move the movable fairing assembly relative to the fixed fairing assembly.

10. A fairing system, comprising:
a fixed fairing assembly configured to attach to a cab of a tractor-trailer, the fixed fairing assembly having a movable first top portion;
a movable fairing assembly configured to attach to at least one of the fixed fairing assembly or the cab of the tractor-trailer, the movable fairing assembly having a movable second top portion; and
an actuator assembly configured to move the movable fairing assembly relative to the fixed fairing assembly.

11. The fairing system of claim 10, wherein the movable fairing assembly is configured to move from an undeployed position to a deployed position during which the movable first top portion rotates in synchronicity with the movable second top portion.

12. The fairing system of claim 10, wherein the movable fairing assembly is configured to move from an undeployed position to a deployed position during which the movable first top portion rotates rearward and downward.

13. The fairing system of claim 10, wherein the movable fairing assembly is configured to move from an undeployed position to a deployed position during which the movable second top portion rotates rearward and moves upward.

14. The fairing system of claim 10, wherein the movable fairing assembly is configured to move from an undeployed position to a deployed position during which the movable first top portion rotates rearward and moves downward and the movable second top portion rotates rearward and moves upward in synchronicity with the movement of the movable first top portion.

15. The fairing system of claim 10, wherein the movable fairing assembly is configured to move from an undeployed position to a deployed position during which the movable second top portion rotates rearward and upward to at least partially cover a gap defined between the cab and a trailer.

16. The fairing system of claim 10, wherein the movable fairing assembly is configured to move from an undeployed position to a deployed position during which the movable first top portion rotates rearward and downward and the movable second top portion rotates rearward and moves upward to form a substantially continuous surface between the cab and a trailer.

17. The fairing system of claim 16, wherein the substantially continuous surface is configured to prevent a passage of air flow from outside of a gap defined between the cab and a trailer into the gap via the substantially continuous surface.

18. A fairing system, comprising:
a fixed fairing assembly configured to attach to a cab of a tractor-trailer, the fixed fairing assembly having a first plurality of lateral portions;
a movable fairing assembly configured to attach to at least one of the fixed fairing assembly or the cab of the tractor-trailer, the movable fairing assembly having a second plurality of lateral portions; and
an actuator assembly configured to move the movable fairing assembly relative to the fixed fairing assembly.

19. The fairing system of claim 18, wherein the movable fairing assembly is configured to move from an undeployed position to a deployed position during which at least one of the second plurality of lateral portions rotate outward and upward.

20. The fairing system of claim 18, wherein the movable fairing assembly is configured to move from an undeployed position to a deployed position thereby defining a longitudinal gap between the first plurality of lateral portions and the second plurality of lateral portions.

21. The fairing system of claim 20, wherein the longitudinal gap has a length such that air flow from outside of a gap defined between the cab and a trailer is preventing from passing into the gap via the longitudinal gap.

* * * * *